(12) United States Patent
Yu et al.

(10) Patent No.: US 11,014,003 B2
(45) Date of Patent: May 25, 2021

(54) EXERCISE INTENSITY-DRIVEN LEVEL DESIGN

(71) Applicant: UNIVERSITY OF MASSACHUSETTS, Boston, MA (US)

(72) Inventors: Lap-Fai Yu, Falls Church, VA (US); Yongqi Zhang, Quincy, MA (US); Biao Xie, Malden, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 53 days.

(21) Appl. No.: 16/706,118

(22) Filed: Dec. 6, 2019

(65) Prior Publication Data

US 2020/0179807 A1    Jun. 11, 2020

Related U.S. Application Data

(60) Provisional application No. 62/776,684, filed on Dec. 7, 2018.

(51) Int. Cl.
| | | |
|---|---|---|
| *A63F 13/67* | (2014.01) | |
| *A63F 13/816* | (2014.01) | |
| *A63F 13/428* | (2014.01) | |
| *A63F 13/212* | (2014.01) | |

(52) U.S. Cl.
CPC .......... *A63F 13/67* (2014.09); *A63F 13/428* (2014.09); *A63F 13/816* (2014.09); *A63F 13/212* (2014.09); *A63F 2300/1012* (2013.01); *A63F 2300/6027* (2013.01); *A63F 2300/8005* (2013.01); *A63F 2300/8082* (2013.01)

(58) Field of Classification Search
CPC ...... A63F 13/212; A63F 13/428; A63F 13/67; A63F 13/816; A63F 2300/1012; A63F 2300/6027; A63F 2300/8005; A63F 2300/8082

See application file for complete search history.

(56) References Cited

U.S. PATENT DOCUMENTS

| | | | | |
|---|---|---|---|---|
| 6,004,243 | A * | 12/1999 | Ewert | A63B 24/00 482/8 |
| 6,142,913 | A * | 11/2000 | Ewert | A63B 24/00 386/E5.002 |
| 7,892,178 | B1 * | 2/2011 | Bady | A61B 5/681 600/500 |
| 9,144,709 | B2 * | 9/2015 | Reich | A63B 21/00178 |
| 10,150,040 | B2 * | 12/2018 | Kraly | A63F 13/67 |
| 10,500,498 | B2 * | 12/2019 | Lowery | A63F 13/67 |
| 10,716,969 | B2 * | 7/2020 | Hoang | A63B 21/0058 |
| 10,940,360 | B2 * | 3/2021 | Dalebout | G16H 20/30 |

(Continued)

*Primary Examiner* — William H McCulloch, Jr.
(74) *Attorney, Agent, or Firm* — Brake Hughes Bellermann LLP

(57) ABSTRACT

Balancing an exercise intensity level and a fun factor of a game is non-trivial and challenging. Disclosed herein are aspects and embodiments of an optimization-based approach to address this challenge. The approach can be applied to synthesize a game level with a desired exercise intensity level. By formulating the design problem as an optimization, a level designer can easily balance factors concerning the exercise intensity level of the game as well as other design factors and constraints.

20 Claims, 24 Drawing Sheets

(56) References Cited

U.S. PATENT DOCUMENTS

| | | | | |
|---|---|---|---|---|
| 2004/0023761 | A1* | 2/2004 | Emery | A63B 21/0615 |
| | | | | 482/94 |
| 2005/0223799 | A1* | 10/2005 | Murphy | A61B 5/1124 |
| | | | | 73/510 |
| 2005/0272561 | A1* | 12/2005 | Cammerata | A63B 24/0062 |
| | | | | 482/8 |
| 2009/0029769 | A1* | 1/2009 | Muller | A63F 13/816 |
| | | | | 463/31 |
| 2009/0098980 | A1* | 4/2009 | Waters | G16H 20/30 |
| | | | | 482/8 |
| 2010/0248901 | A1* | 9/2010 | Martens | A63B 22/00 |
| | | | | 482/8 |
| 2010/0317489 | A1* | 12/2010 | Flaction | A63B 24/0062 |
| | | | | 482/9 |
| 2011/0172058 | A1* | 7/2011 | Deaconu | A63B 22/0605 |
| | | | | 482/5 |
| 2011/0287896 | A1* | 11/2011 | Kim | A63B 21/065 |
| | | | | 482/8 |
| 2014/0278274 | A1* | 9/2014 | Osher | G06F 30/13 |
| | | | | 703/1 |
| 2014/0336947 | A1* | 11/2014 | Walke | A61B 5/6898 |
| | | | | 702/19 |
| 2015/0148619 | A1* | 5/2015 | Berg | A61B 5/0024 |
| | | | | 600/301 |
| 2018/0344215 | A1* | 12/2018 | Ohnemus | A63F 13/798 |
| 2019/0030394 | A1* | 1/2019 | Orr | A63B 21/4005 |
| 2020/0179807 | A1* | 6/2020 | Yu | A63F 13/428 |

* cited by examiner

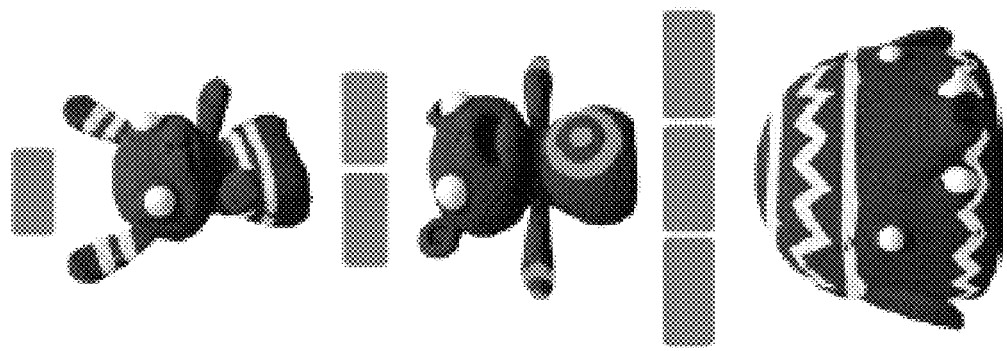

EXERCISE INTENSITY-DRIVEN LEVEL DESIGN

CROSS REFERENCE TO RELATED APPLICATION

This application claims the benefit of U.S. Provisional Application No. 62/776,684, filed Dec. 7, 2018, the disclosure of which is incorporated herein by reference in its entirety.

GOVERNMENT LICENSE RIGHTS

This invention was made with government support under award number 1565978 awarded by the National Science Foundation. The government has certain rights in the invention.

BACKGROUND

Games and experiences designed for virtual or augmented reality may include features in which a player moves physically to play. This poses substantial challenge for level designers because the physical experience of a player in a level should be considered, otherwise the level may turn out to be too exhausting or not challenging enough.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 5B illustrates three types of "enemies" encountered in the shooting example exergame, Longbowman;

DETAILED DESCRIPTION

Aspects and embodiments disclosed herein are generally directed to an approach to optimize level designs in virtual reality-based motion-based games (exergames) by considering the physical challenge imposed upon a player in completing a level of the motion-based games. A game level is represented as an assembly of "chunks" characterized by the exercise intensity levels they impose on players. In accordance with aspects and embodiments disclosed herein game level synthesis is formulated as an optimization problem, where the chunks are assembled in a way to achieve an optimized level of exercise intensity for a player.

To allow the synthesis of game levels of varying lengths, a trans-dimensional optimization problem is solved using a Reversible-jump Markov chain Monte Carlo technique. The approach can be applied to generate game levels for multiple forms of motion-based virtual reality games.

Figure 1A:
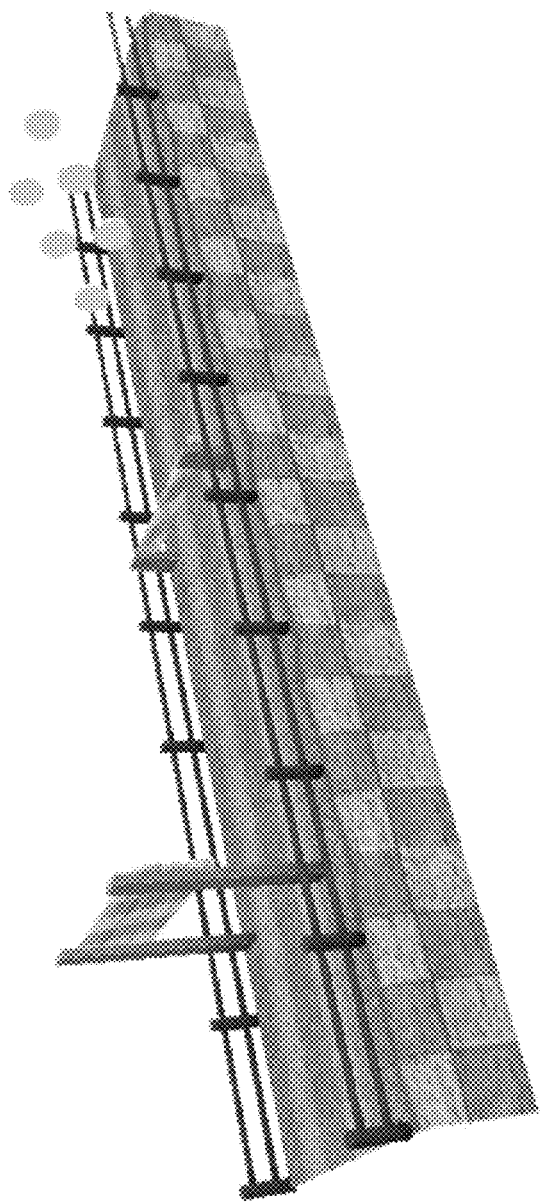
FIG. 1A illustrates part of a synthesized level of a virtual reality-based exergame composed of different chunks that require a player to perform different motions to pass.
Figure 1B:
FIG. 1B illustrates some example motions performed by the player to complete the level of FIG. 1A.
Figure 1B:
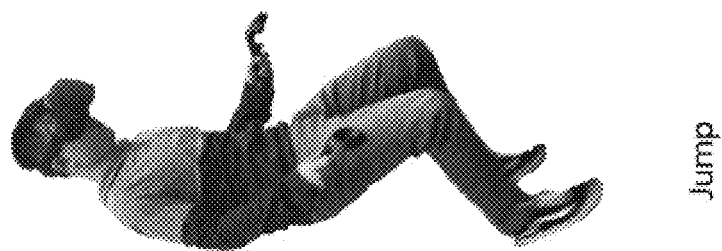
Figure 1B:

In view of the rapidly gaining popularity of virtual reality devices, many game companies are working to transform their gaming platform from personal computers to virtual reality headsets. This transition poses a new challenge to level designers to create games that take physical comfort of players into account. Traditionally, video games are designed to be played with a game controller which involves only hand and finger movement, and the fatigue level of a player is not an important concern nor consideration. In contrast, many virtual reality games require full body motions such as squatting, jumping and catching (see FIG. 1A and FIG. 1B for some examples), with each motion causing a certain amount of fatigue. The player could quickly feel exhausted if the level is not designed well, which may prompt him or her to stop or quit the game. Balancing the exercise intensity level and the fun factor of the game is non-trivial and challenging.

Disclosed herein are aspects and embodiments of an optimization-based approach to address this challenge. The approach can be applied to synthesize a game level with a desired exercise intensity level. By formulating the design problem as an optimization, a level designer can easily balance factors concerning the exercise intensity level of the game as well as other design factors and constraints.

Aspects and embodiments disclosed herein provide a solution to a novel problem statement of optimizing level designs with respect to exercise intensity. The concepts disclosed herein may be applied to improve the user experience of different motion-based games, which constitute a majority of games played on virtual or augmented devices.

Aspects and embodiments disclosed herein include a novel optimization-based approach to automatically synthesize game levels while considering the physical experience of player. Experiments were performed that demonstrate that the approach works for different types of motion-based games. The effectiveness of the approach in generating optimized games levels was validated through user evaluations.

Exercise Intensity in Game Design

The extent of physical challenge is considered as an important factor in designing motion-based games. There have been studies about the relationship between the level of physical challenge and how much fun a game offers. Various studies have concluded that a player derives the most fun from a game when the level is neither too simple nor too difficult to complete. While it is found important to appropriately set the physical challenge level, in current practice the setting is usually done manually and tested by a trial-and-error approach, which is non-trivial, tedious and largely dependent on the experience of a level designer. It would be beneficial to quantify the exercise intensity involved in a game level so that scientific analysis and optimization can be performed. Aspects and embodiments of the approach disclosed herein demonstrate how exercise intensity considerations can be incorporated into the automatic synthesis of a game level.

Exergaming

The widespread popularity of human-computer interaction devices for gaming such as depth sensors (e.g., the Microsoft Kinect™ sensor) and motion controllers (e.g., the Nintendo Wii™ remote) have given rise to a new genre of games known as fitness games or exergames, which refer to video games that are also a form of exercises. Recently, with the growing popularity of household virtual reality devices such as the Oculus Rift™ device and the HTC Vive™ device, companies have started to explore the possibility of developing exergames that are played via virtual reality devices, which have aroused much commercial and research interests. For example, VirZOOM and CSE Entertainment developed exergaming systems that allow players to exercise on a cycling machine while navigating through a virtual scene viewed via a virtual reality headset. The exergaming systems, in some implementations, allow players to exercise on a treadmill, an elliptical machine, a stair machine, a recumbent cycling machine, weight machines, and the like, while navigating through a virtual scene viewed via a virtual reality headset. ICAROS integrated virtual reality headsets with fitness equipment to create highly immersive VR experiences which entertain the player while they are working out. Using virtual reality devices for exergaming is becoming increasingly popular. Recent research has validated the positive effects of exergaming for rehabilitation and therapy purposes such as weight control, balance enhancement and cognitive-motor training. Exergames may be used as a strategic tool to motivate young adults to lose weight, may help enhance muscle strength and restore physical function of elders, may reduce the risk of elders from falling, and may improve movement- and balance-related physical performance of elders. The term "exergames" as used herein may also be denoted as "games."

Exergaming brings health benefits to players, motivating them to exercise and improve their health conditions. One element for the success of such kinds of systems is the provision of virtual reality content with an appropriate level of exercise intensity for the player. However, most existing exergames require a level designer to manually design and develop levels having suitable exercise intensity levels. In contrast, aspects and embodiments of the approach disclosed herein are capable of generating optimized game levels automatically for exergaming in virtual reality.

Procedural Level Design

Procedural techniques have been successfully applied for designing game levels. For example, rule-based and learning-based approaches (e.g., via neural networks) have been applied for generating levels for the Super Mario Bros™ video game. There is no previous work known which explicitly uses exercise intensity metrics as a criterion to optimize a game level, as in aspects and embodiments disclosed herein.

By using procedural techniques, game content can be created in a fast and scalable manner and can even be generated on-the-fly during the gameplay. Another advantage is that random variation among the generated game content can keep the game fresh and interesting to the player. A challenge of automatic content generation or virtual world synthesis approaches lies in controlling the procedural techniques to generate game levels or virtual worlds that satisfy the constraints and goals of a designer. To tackle this problem, aspects and embodiments of the approach disclosed herein utilize an optimization framework upon which different design goals and constraints can be incorporated and hence automatically considered by the optimizer in synthesizing a level design. In particular, aspects and embodiments of the approach disclosed herein incorporate exercise intensity level, an important design factor to consider in motion-based games, in the game level synthesis process. Hence, aspects and embodiments of the approach disclosed herein are especially useful for designing motion-based games for virtual or augmented reality experiences.

Overview

Figure 2:
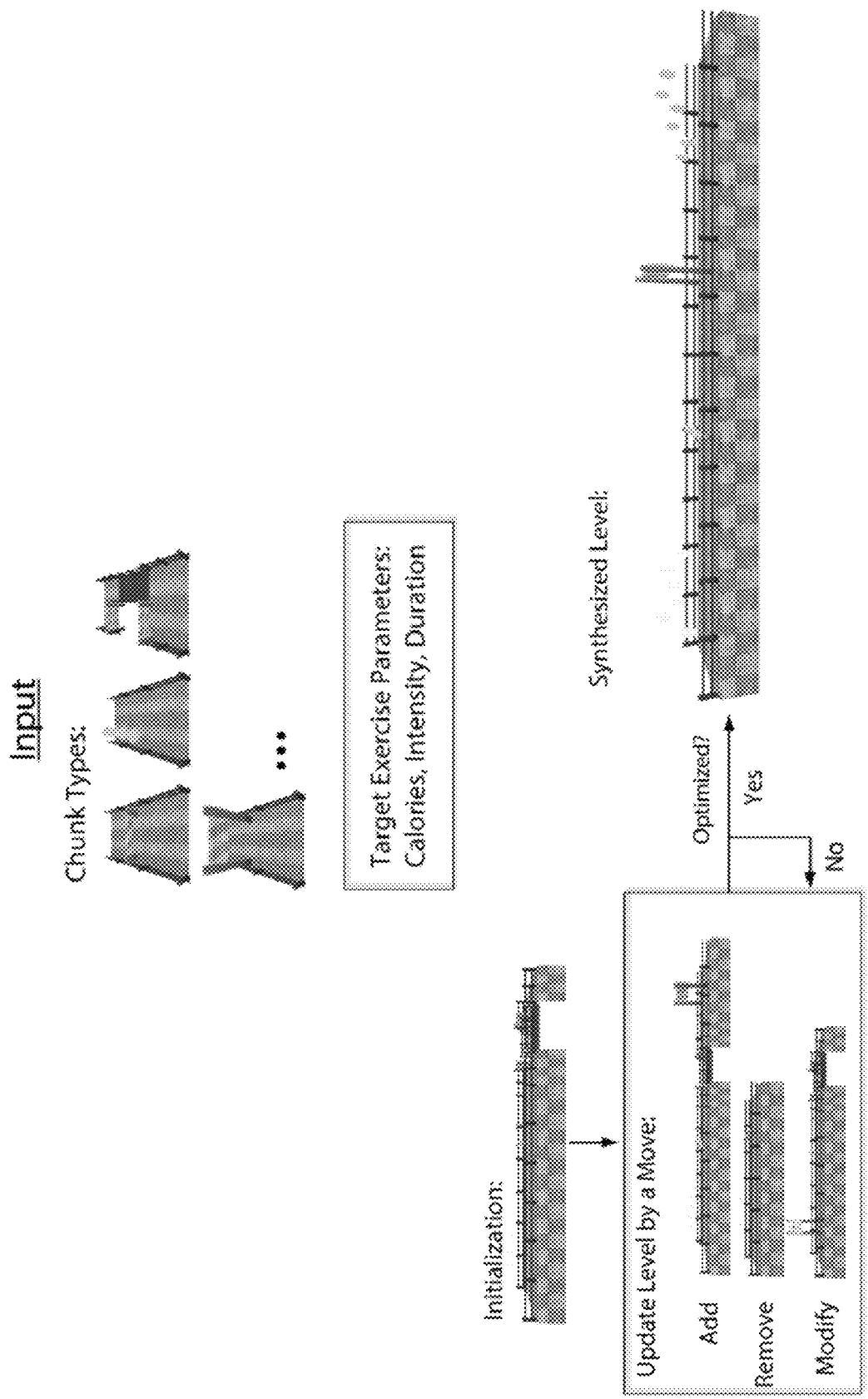
FIG. 2 illustrates an overview of an embodiment of generating a game level.

FIG. 2 shows an overview of one embodiment of the approach disclosed herein. Given different types of chunks for assembling a game level plus their exercise intensity properties, the approach includes running an optimization to assemble different game levels using a varying number of chunks. In each iteration of the optimization, the assembled game level is evaluated for the physical difficulty it imposes on a player to complete the level. The game level is iteratively updated by the optimizer until a desirable extent of physical difficulty is achieved.

Reflex (Running Example).

To facilitate the illustration of the approach disclosed herein, we focus on a motion-based game called Reflex created for illustration and experiment purposes. The game design of Reflex mimics that of a game called Reflex Ridge played using the Microsoft Kinect™ sensor, which has been employed for previous physical therapy study. While the game logic is similar, the interaction and visualization design are changed in Reflex such that the player plays the game through an HTC Vive™ virtual reality device rather than a Kinect™ sensor. The HTC Vive™ device tracks the player's motion such as stepping left or right, jumping, and crouching down, while the player sees the virtual world through a VR headset. This gives the player an even more immersive experience than playing through a Kinect™ sensor and a TV screen.

Game Logic

Figure 3:
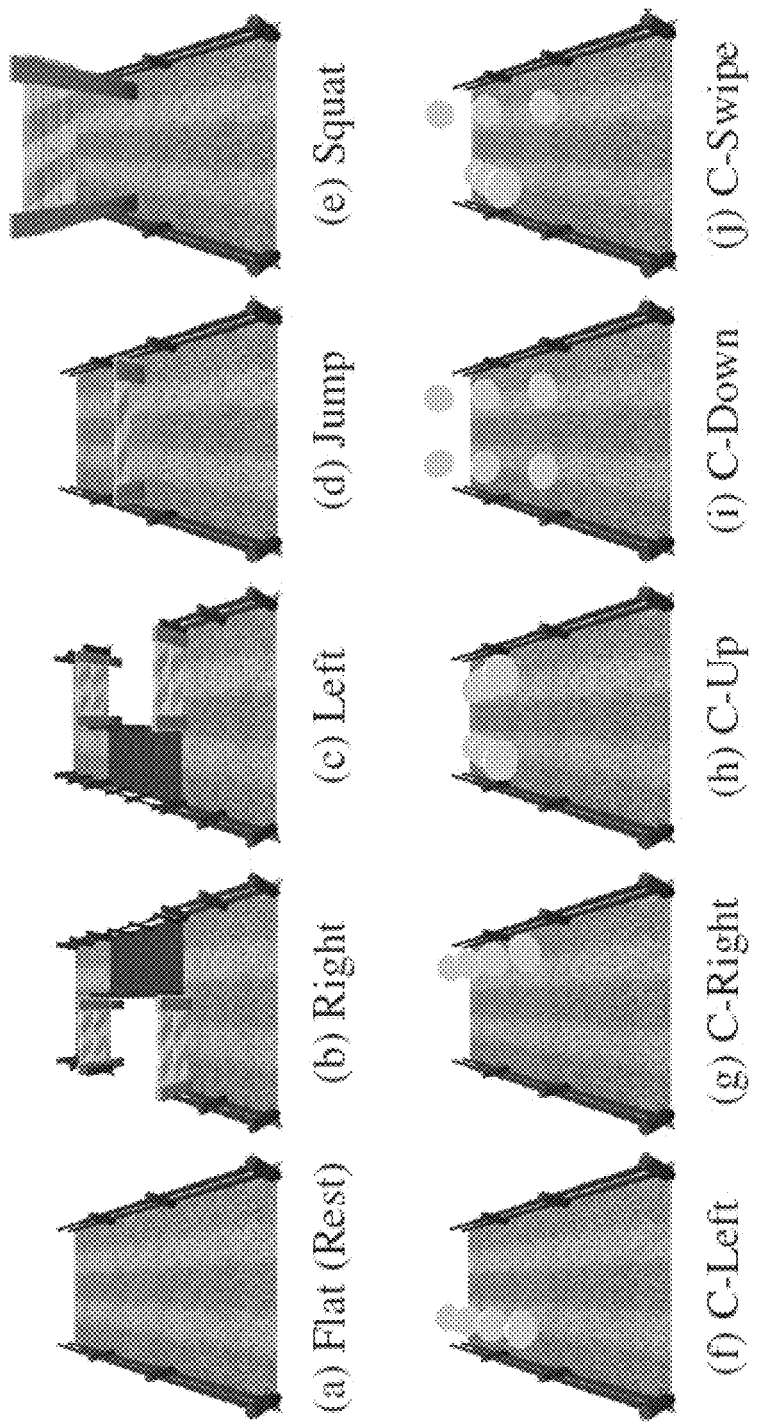
FIG. 3 illustrates different types of chunks for assembling a game level for the running example game, Reflex.

A game level of the Reflex game consists of a runway assembled by a number of chunks. The chunks belong to one of the chunk types as depicted in FIG. 3. The chunk types a-e require the player to avoid obstacles, while the chunk types f-j require the player to catch coins. As the game starts, the runway starts rolling towards the player. Depending on the chunk type, the player passes each chunk by moving his body to bypass any obstacle or by catching all coins with their hands. The game ends when the player has reached the end of the runway. Depending on the chunks used to assemble a level, completing a level requires different extent of physical
movements and hence imposes a different amount of exercise intensity on the player.

Technical Approach

Aspects and embodiments of the approach disclosed herein provide for a user to synthesize levels optimized with respect to a desired level of exercise intensity and other design factors, which are encoded by cost terms.

Formulation

Let $l=(c_1, c_2, \ldots, c_n)$ denote a level, which consists of a number of chunks $c_i$ assembled in a sequential order. Each chunk $c_i$ belongs to a certain chunk type $T_i$, where $T_i \in T$ and $T$ is the set of all chunk types. For example, the running example game Reflex has 10 chunk types as depicted in FIG. 3.

The quality of a level $l$ is evaluated by a total cost function $C_{Total}(l)$:

$$C_{Total}(l) = C_I w_I^T + C_P w_P^T,$$

where $C_I = [C_I^c, C_I^m, C_I^v]$ is a vector of intensity costs and $w_I = [w_I^c, w_I^m, w_I^v]$ is a vector of weights. $C_I^c$, $C_I^m$, and $C_I^v$ encode the exercise intensity considerations: the total amount of calories burned to complete the level, the mean intensity throughout the experience, and the variance in intensity among the chunks. $C_P$ is a vector of game-specific prior costs encoding design priors such as duration and variation between adjacent chunks, and $w_P$ stores the weights of these costs.

Chunk Type Intensity and Duration

Each chunk type $T_i$ is associated with an intensity level $I_i$ and a duration $D_i$ for completing the chunk, which is estimated by the designer or found empirically as follows.

In exercise science, heart rate is commonly used as a metric to evaluate the intensity level of a certain type of exercise. Exercises with different intensity levels may be performed to achieve different training purposes. The intensity level associated with each chunk type may be quantified similarly. In one example, the intensity level $I_i$ of each chunk type $T_i$ is found empirically by the following steps:

1. First, a level consisting of an infinite number of chunks with chunk type $T_i$ is prepared.
2. Healthy participants are recruited to play a level for about 5 minutes. The heart rate of each participant during this game-play is recorded by a wearable heart rate recorder (e.g., a Polar T31™ heart rate monitor).
3. The intensity $I_i$ is calculated by the Karvonen formula:

$$H = (H_{max} - H_{rest})I_i + H_{rest},$$

$$I_i = \frac{H - H_{rest}}{H_{max} - H_{rest}},$$

where $I_i \in [0,1]$; $H_{max} = 220 - a$ with $a$ being the participant's age; $H$ is the average measured heart rate of the participant during the game level; $H_{rest}$ is the resting heart rate of the participant.

4. The duration $D_i$ (in seconds) associated with chunk type $T_i$ is calculated as the average time the participants take to finish each chunk of that type.

Table 1 shows the intensities of different types of chunks used for synthesizing a level for the running example game, Reflex, found following the above procedure.

TABLE 1

Intensity level of each type of chunk for the running example game, Reflex.

| Chunk Type | Intensity | Chunk Type | Intensity |
| --- | --- | --- | --- |
| Flat | 12.6% | C-Left | 28.1% |
| Right | 14.2% | C-Right | 26.0% |
| Left | 14.2% | C-Up | 27.6% |
| Jump | 55.1% | C-Down | 31.5% |
| Squat | 32.5% | C-Swipe | 25.4% |

Intensity Costs

Three costs are defined to encode the exercise intensity considerations of a level l.

Calorie Cost: This cost compares the amount of energy needed to complete the level with a target amount of energy expenditure expressed in terms of calories:

$$C_I^c(l) = \frac{1}{N}\left|\sum_{c_i} G(c_i)D(c_i) - \rho_{cal}\right|,$$

where $D(c_i)$ returns the average duration for completing chunk $c_i$ based on its chunk type. $\rho_{cal}$ is the target total amount of calories burned. N is a normalization constant set as $N = \kappa_1 \kappa_2 \kappa_3$, where $\kappa_1$ is the upper bound on the number of chunks used to assemble a level (set as 200 for Reflex), $\kappa_2$ is the calories burned in finishing a chunk of the type associated with the maximum intensity level, and $\kappa_3$ is the duration needed to finish a chunk of the type associated with the longest duration. $G(c_i)$ is set based on the formulas and measurements from Keytel et al. Prediction of energy expenditure from heartrate monitoring during submaximal exercise. *Journal of sports sciences,* 23(3):289-297, 2005, incorporated by reference herein in its entirety:

$$G(c_i) = (\mu_1 + \mu_2 H(c_i) + \mu_3 \omega + \mu_4 a) \mu_5,$$

where $H(c_i)$ returns the average heart rate in playing chunk $c_i$ according to the intensity level of its chunk type; $\omega$ is the weight (in kg) of the player and a is the age of the player. In one example, the default resting heart rate of the player is set at 70 beats per minute. IN some embodiments, a game level designer can specify an expected weight (e.g., 70 kg) of the target player who is going to play this level. Alternatively, a player can specify his/her weight in a game program, which can be used by the game level synthesis algorithm to generate a game level for him/her to play.

The μ coefficients are gender-specific. For a male player, $\mu_1 = -55.0969$, $\mu_2 = 0.6309$, $\mu_3 = 0.1988$, and $\mu_4 = 0.2017$. For a female player, $\mu_1 = -20.4022$, $\mu_2 = 0.4472$, $\mu_3 = -0.1263$, and $\mu_4 = 0.0740$. For both genders, $\mu_5 = 1/(4.184 \times 60)$.

Mean Intensity Cost: This cost evaluates the mean intensity of a level with respect to a target mean intensity:

$$C_I^m(l) = \frac{1}{|l|} \sum_{c_i} I(c_i) - \rho_m,$$

where $\rho_m$ is the target mean intensity (e.g., 50%) and $|l|$ is the total number of chunks in a level l. If a level is too intense, this cost will be high and more "resting" chunks (i.e., flat chunks) will be added by the optimizer to lower the average intensity.

Intensity Variation Cost: A cost is also defined to evaluate how much variation in intensity exists among the selected chunks. A high cost means large variation:

$$C_I^v(l) = \frac{1}{|l|} \sum_{c_i} (I(c_i) - \bar{I})^2 - \rho_v,$$

where $\rho_v$ is a target variance in intensity and $\bar{I}$ is the mean of the intensity of the chunks.

Prior Costs

Different prior costs can be defined to encode game-specific level design considerations. For example, game levels of a certain total duration may be desired. It may also be preferable to assemble a level using chunks of different chunk types, so that the level will appear more diverse and fun. Two prior costs are defined herein for illustration:

Duration Cost: A cost is defined to softly constrain the level to be of a certain duration:

$$C_P^d(l) = 1 - \exp\left(-\frac{\left(\sum_{c_i} D(c_i) - \rho_d\right)^2}{2\sigma^2}\right),$$

where $\rho_d$ is the target duration of the game level and $\sigma$ is set as $0.5\rho_d$. These parameters are used as the mean and standard deviation of a Gaussian distribution for evaluating how close the duration of the level is with respect to the target duration.

Adjacent Chunk Variation Cost: We also define a cost to penalize levels that are "monotonic", i.e., consisting of adjacent chunks with the same chunk type:

$$c_P^v(l) = \frac{1}{|l|-1} \sum_{c_i, c_{i+1}} \Gamma(c_i, c_{i+1}),$$

where $c_i$ and $c_{i+1}$ are adjacent chunks. $\Gamma(c_i, c_{i+1})$ returns 1 if $c_i$ and $c_{i+1}$ are of the same chunk type, otherwise it returns 0.

Other types of prior costs can be similarly defined and incorporated into the optimization framework depending on the specific requirements of a game under design.

Optimization

A level may be synthesized by optimizing it with respect to the total cost function CTotal(l). To solve the optimization, a Markov chain Monte Carlo technique may be applied, namely, simulated annealing with a Metropolis-Hastings state searching step. As a level could be assembled by an arbitrary number of chunks, the optimization is performed in a trans-dimensional solution space. To effectively sample solutions from spaces of levels assembled by different numbers of chunks, the reversible-jump Markov chain Monte Carlo technique is employed. First, a Boltzmann-like objective function is defined:

$$f(l) = \exp\left(-\frac{1}{t} C_{Total}(l)\right),$$

where t is the temperature parameter of simulated annealing. At each iteration of the optimization, the approach applies a move to alter the current level l to create a proposed level l'. The move belongs to one of the following types:

Add a Chunk: a chunk with a randomly selected chunk type is added to a random location of the current level l to create a proposed level l';

Remove a Chunk: a chunk is randomly selected and removed from the current level l to create a proposed level l';

Modify a Chunk: a chunk is randomly selected from the current level l and its chunk type is modified to a randomly selected chunk type to create a proposed level l'.

The selection probabilities of the add, remove and modify moves are set as $\rho_a$, $\rho_r$ and $\rho_m$. Unless otherwise specified, $\rho_a = 0.4$, $\rho_r = 0.2$ and $\rho_m = 0.4$ are used in the Examples disclosed herein such that the add and modify moves are selected with a higher probability.

To decide whether to accept the proposed level l', the approach compares the total cost value $C_{Total}(l')$ of the proposed level l' with the total cost value $C_{Total}(l)$ of the original level l. To maintain the detailed balance condition in the trans-dimensional optimization, the approach accepts the proposed level l' with the following acceptance probability Pr(l'|l) specified based on the Metropolis criterion:

For an Add a Chunk move, $$Pr(l'|l) = \min\left(1, \frac{p_r}{p_a} \frac{Z - |l|}{|l'|} \frac{f(l')}{f(l)}\right),$$

For a Remove a Chunk move, $$Pr(l'|l) = \min\left(1, \frac{p_a}{p_r} \frac{|l|}{Z - |l'|} \frac{f(l')}{f(l)}\right),$$

For a Modify a Chunk move, $$Pr(l'|l) = \min\left(1, \frac{f(l')}{f(l)}\right)$$

Note that for formulation simplicity, the approach assumes that each chunk type $T_i$ can only be selected $Z_i$ times rather than an infinite number of times, so that the dimensionality of the solution space has an upper limit. A level can be assembled with up to $Z=\Sigma i Z_i$ chunks. We set $Z_i=20$ for each chunk type in the Examples disclosed herein.

A simulated annealing is applied to efficiently explore the solution space, which is controlled by the temperature parameter t. At the beginning of the optimization, t is set to be high such that the optimizer aggressively explores the solution space to locate a good start. Throughout the optimization, the temperature t is lowered gradually until it reaches a low level which is near zero. In one example, by default, we set t=1.0 at the beginning of the optimization and decreases it by 0.1 every 3,000 iterations, until it reaches zero. Essentially, the optimizer becomes more greedy to refine the solution. In one example, the optimization may be set to terminate if the change in the total cost is less than 3% over the previous 50 iterations although different percent change and iteration number thresholds may be utilized in different examples.

Unless otherwise specified, we set the weights as $w_I^c=1.0$, $w_I^m=0.5$, and $w_I^v=0.1$ in the optimization utilized in the Examples disclosed herein. The weights of all the prior cost terms are set as 0.1. Designers can control the synthesis to emphasize certain design goals by changing these weights.

Figure 4:
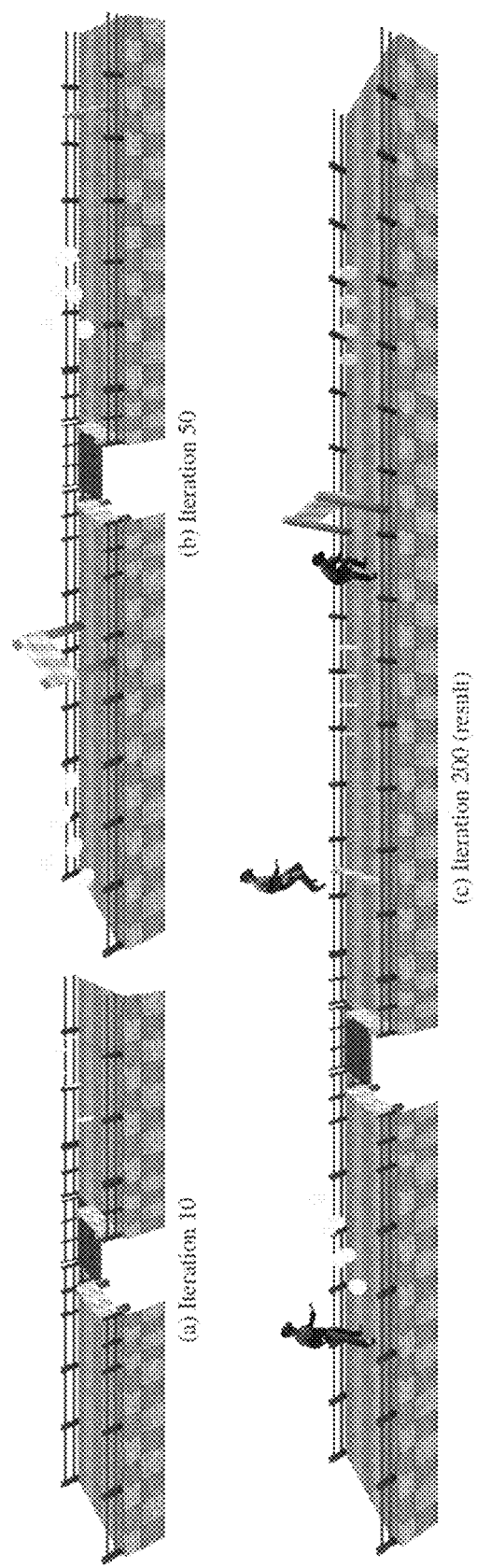
FIG. 4 illustrates synthesized levels for the running example game, Reflex throughout an optimization.
Figure 13:
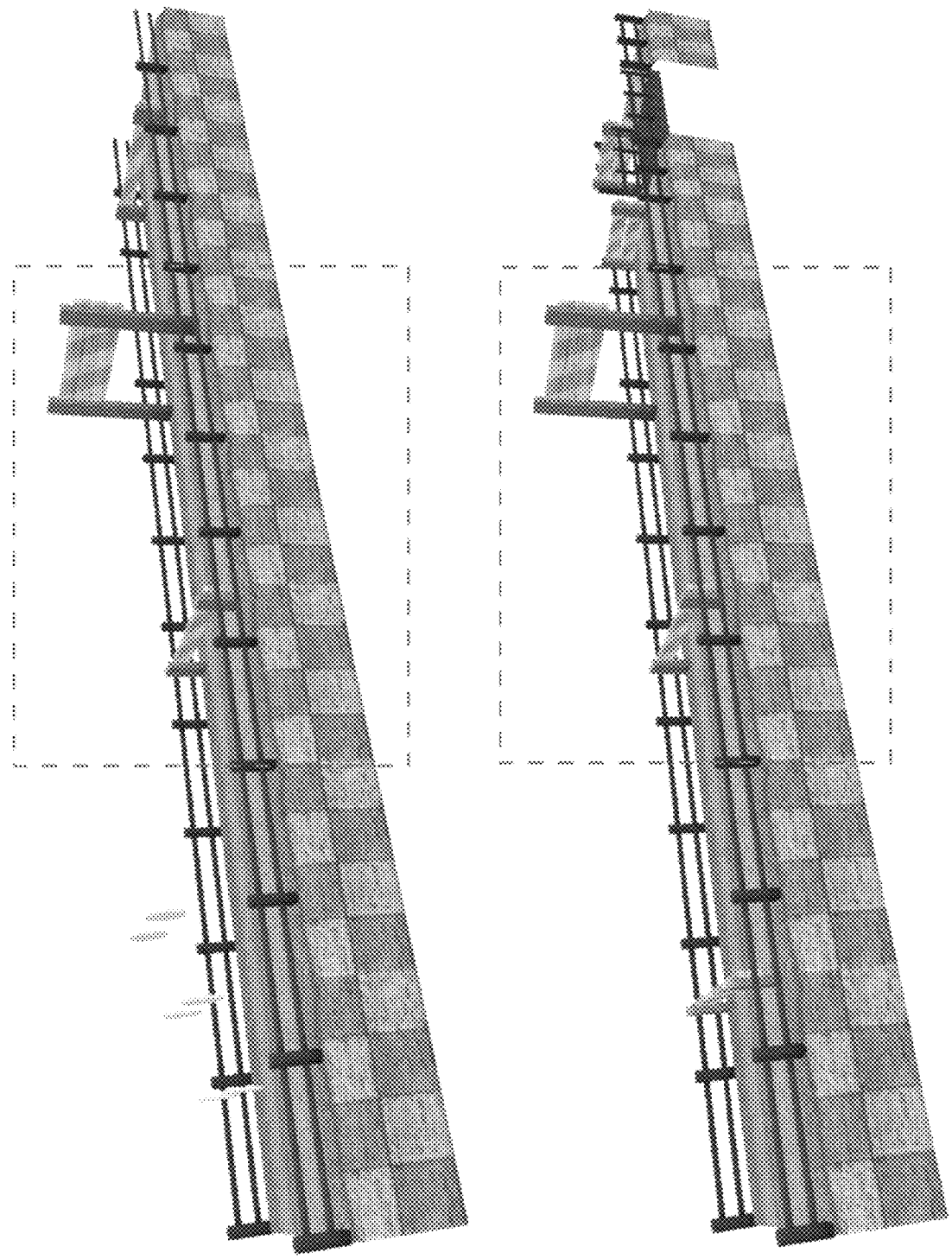
FIG. 13 illustrates two different levels for the running example game, Reflex with the middle chunk fixed by a level designer.

FIG. 4 shows the levels synthesized throughout an optimization for an example of the Reflex game. For visualization convenience, in this illustrative example we synthesize a rather short level by specifying a target duration ρd corresponding to about 8 chunks. FIG. 13 shows parts of two different levels synthesized with the middle two chunks within the dashed squares fixed by the designer. Aspects and embodiments of the approach disclosed herein are capable of synthesizing the rest of the levels with respect to the optimization goals. This functionality could be helpful to the level designer in practice, in case he wants to constrain certain parts of a level to certain types, while letting the optimizer complete the design.

Experiments & Results
Implementation

We implemented our approach on an Alienware PC equipped with an Intel® Core i7™-5820K CPU and 32 GB of memory. The optimization framework is implemented in C# as a plugin for the Unity game engine. The games used for experiments are implemented in Unity using the Software Development Kit (SDK) of the HTC Vive™ device. Depending on the game, synthesizing a game level consisting of 90 chunks (for a Reflex level of about 180 seconds) may take about 30,000 optimization steps, which can be finished in about 10 seconds based on our current implementation.

We demonstrate how our approach can be applied to synthesize levels for two games, Reflex and Longbowman, in the following. The levels are used for user evaluation tests that are described below.

Reflex

We first synthesize three different levels for the running example game, Reflex. The three levels are synthesized with physical difficulty levels of easy, medium and hard, specifically, with target mean intensity level ρm set as 15%, 30% and 40% respectively; and target calories burned ρcal set as 10 kcal, 15 kcal and 20 kcal. The target duration time ρd is set as 180 seconds for all three levels, and the target intensity variation ρv is set as 0.8 to make the level entertaining by introducing variation among tracks.

Figure 8A:
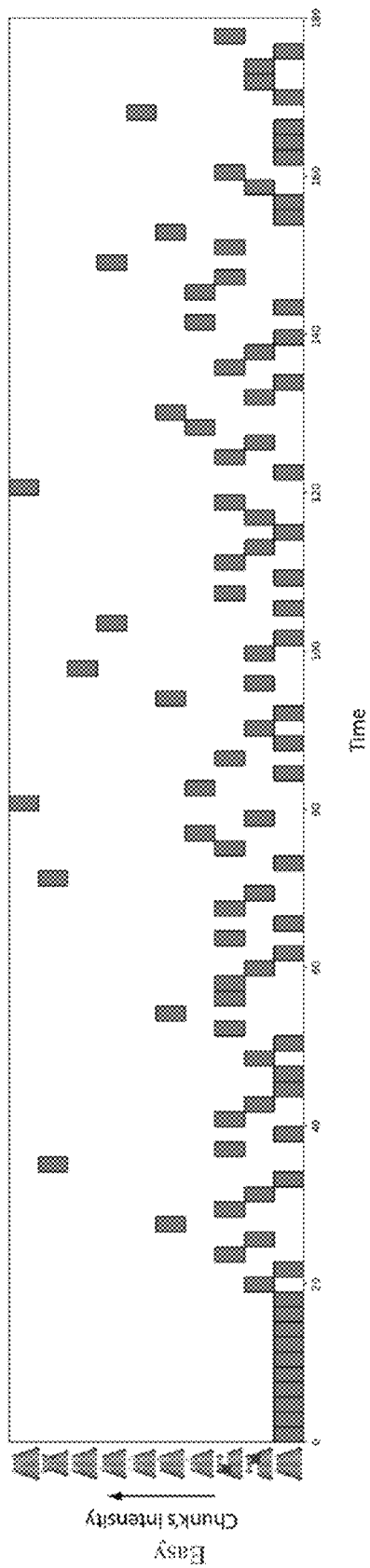
FIG. 8A illustrates a chunk type and sequence in an example of a level for the running example game, Reflex set for an easy or low exercise intensity level where each bar refers to a chunk that appears at a certain time in the level.
Figure 8B:
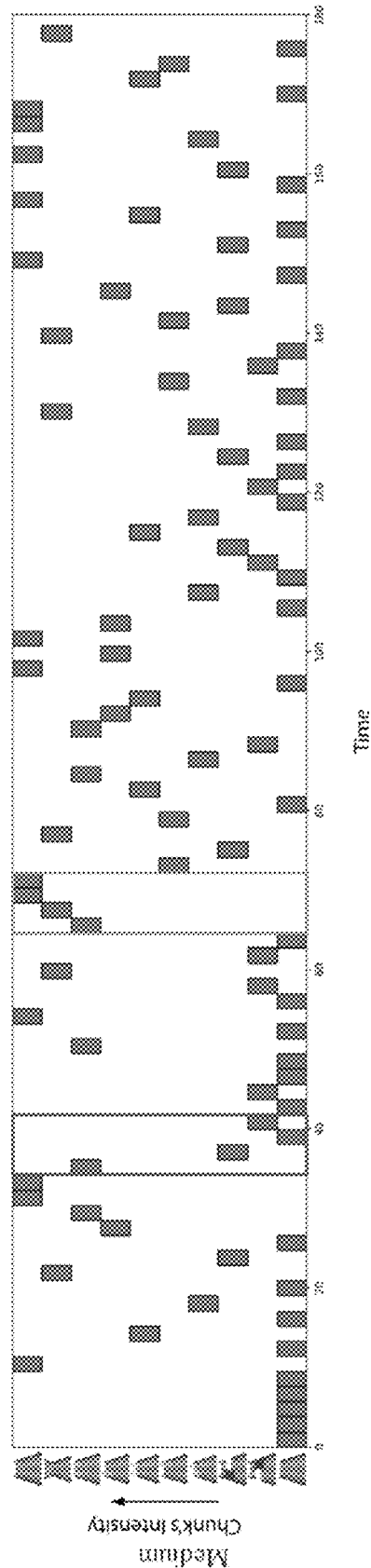
FIG. 8B illustrates a chunk type and sequence in an example of a level for the running example game, Reflex set for a medium exercise intensity level.
Figure 8C:
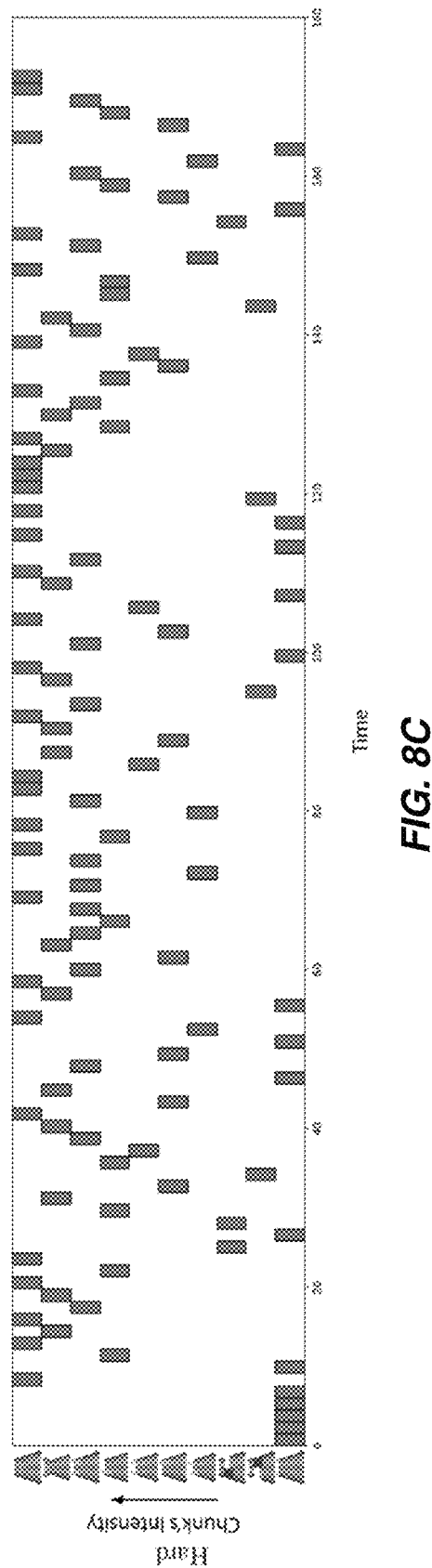
FIG. 8C illustrates a chunk type and sequence in an example of a level for the running example game, Reflex set for a difficult or high exercise intensity level.
Figure 9A:
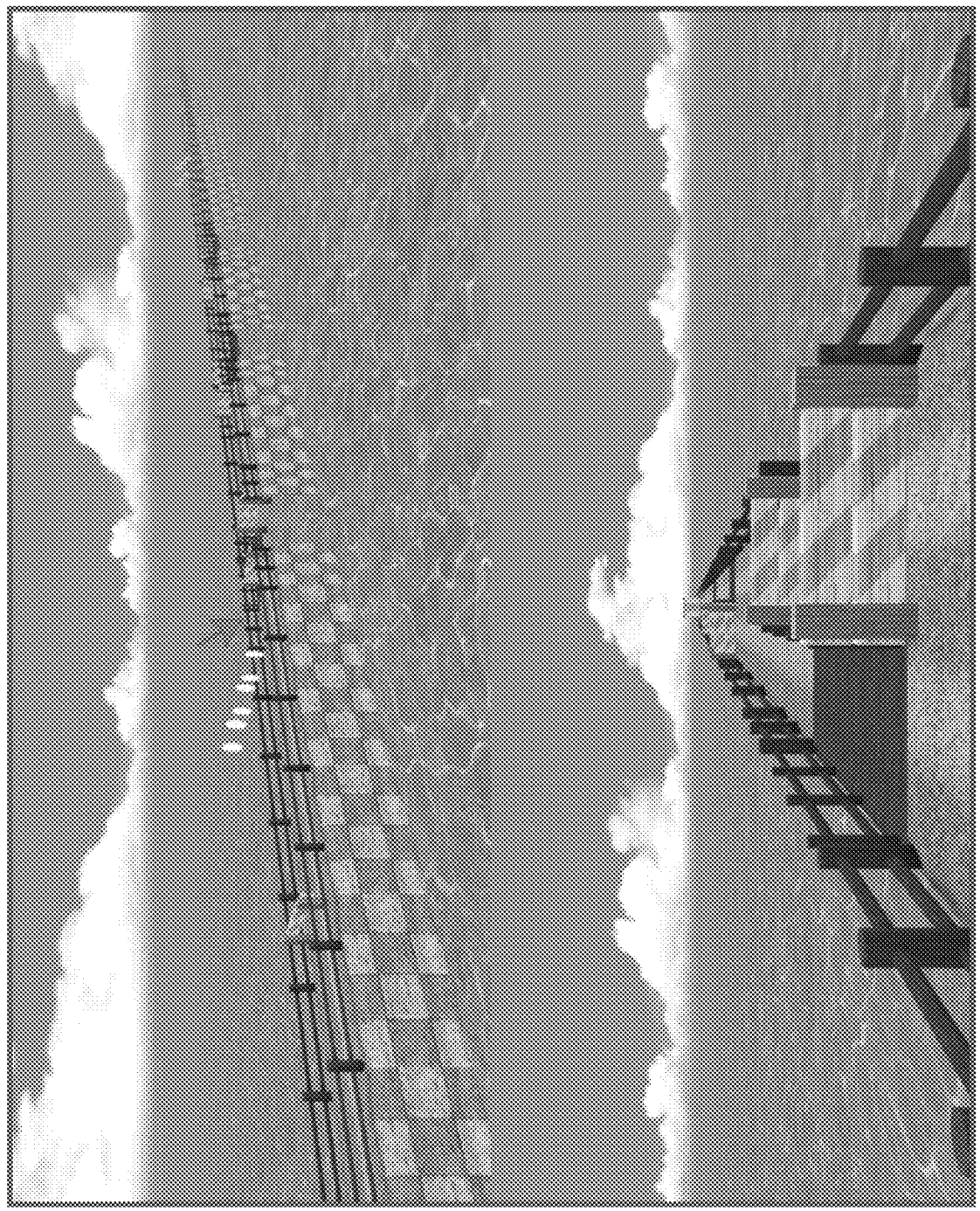
FIG. 9A is a 3D view of a portion of a level of the running example game, Reflex corresponding to the highlighted portion of the level illustrated in FIG. 8B around the 40 second timeframe where the arrow in the upper frame denotes the location of the viewpoint of the player illustrated in the lower frame.
Figure 9B:
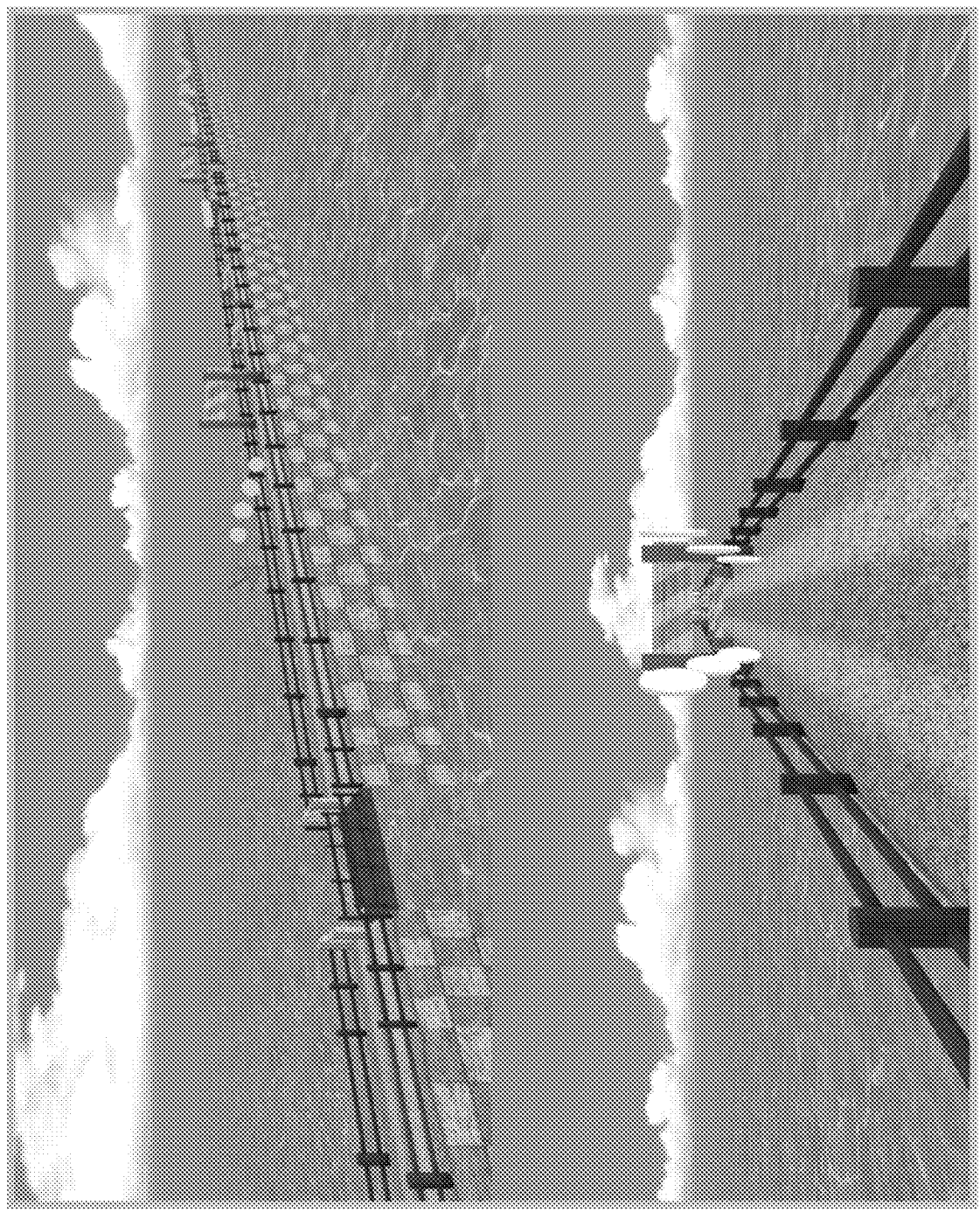
FIG. 9B is a 3D view of a portion of a level of the running example game, Reflex corresponding to the highlighted portion of the level illustrated in FIG. 8B around the 70 second timeframe.

FIGS. 8A-8C shows the chunk type and sequence in the synthesized levels. FIGS. 9A and 9B illustrate screenshots during the gameplay corresponding to the highlighted sections of the medium intensity game level of FIG. 8B. It can be observed that all three synthesized levels have a duration of about 180 seconds. The easy level consists mostly of chunks of low intensity (e.g., "Flat", "Right", "Left"); the medium level is composed of chunks of mixed intensities; while the hard level consists mostly of chunks of high intensity (e.g., "Jump", "Squat", "C-Up").

Longbowman

Figure 5A:
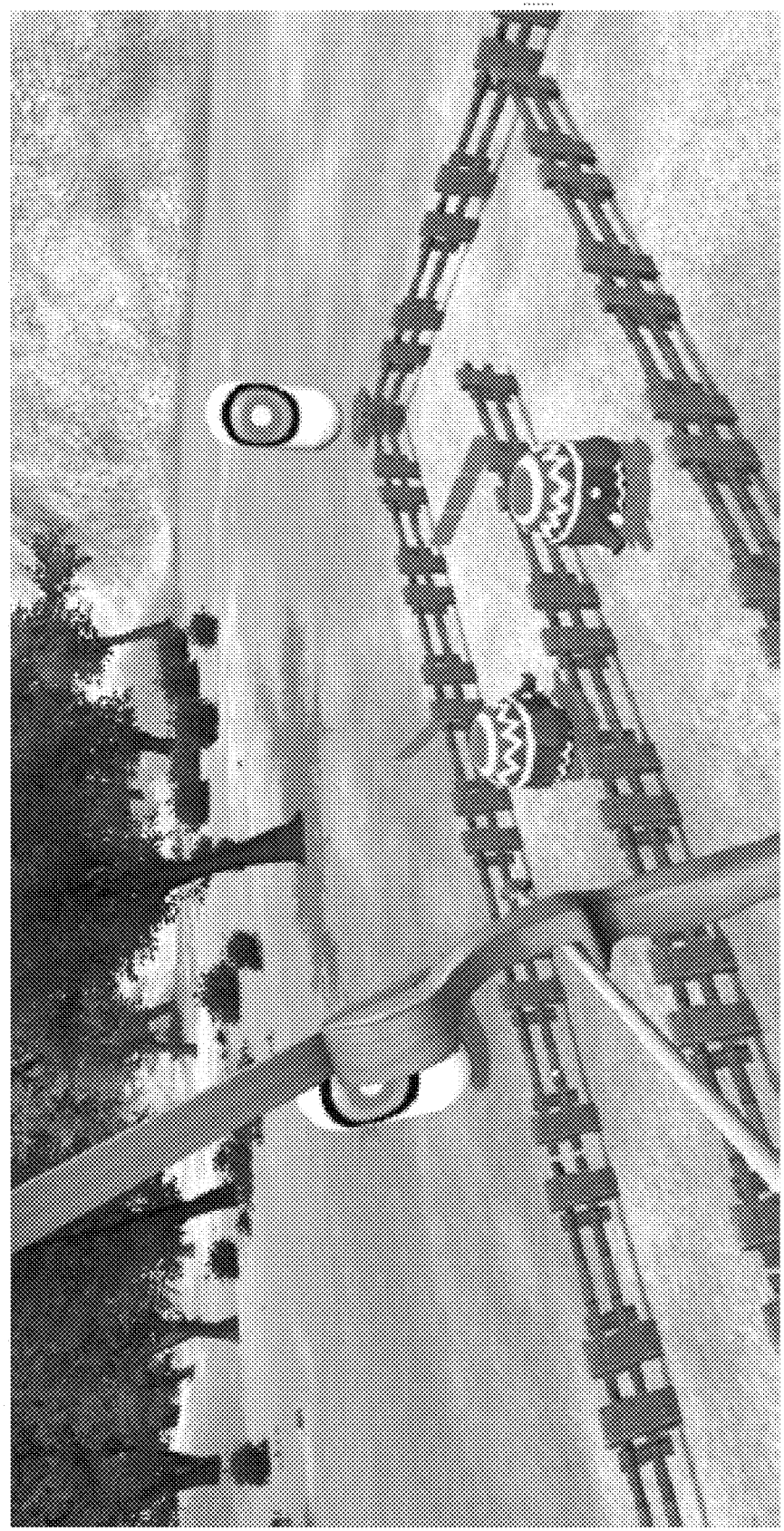
FIG. 5A illustrates a player's view of a a shooting example exergame, Longbowman.

To demonstrate the generality of the approach disclosed herein and to validate its effectiveness in generating level designs with desired physical difficulty properties, we implement another motion-based game called Longbowman. This game mimics a popular shooting game called Longbow available on Steam VR, which is played via an HTC Vive™ device or an Oculus Rift™ device. FIG. 5A shows the player's view of the game. FIG. 5B illustrates different types of enemies in the game, from top to bottom being a Zombunny, Zombear, and Helephant.

Game Logic.

Figure 7:
FIG. 7 illustrates a player performing a shot in the shooting example exergame, Longbowman.

The game logic of Longbowman resembles that of Longbow. The player is tasked with the goal of shooting incoming enemies under a tower with a bow and arrow. The player wears an HTC Vive™ virtual reality device to play the game, moving two controllers to mimic actions of pulling his bow, aiming and shooting an arrow. FIG. 7 shows a player executing a shot. As the player is constantly holding two controllers in a bow-pulling pose, soreness and tiredness easily develop, which add to the exercise intensity of the virtual reality experience.

Figure 6:
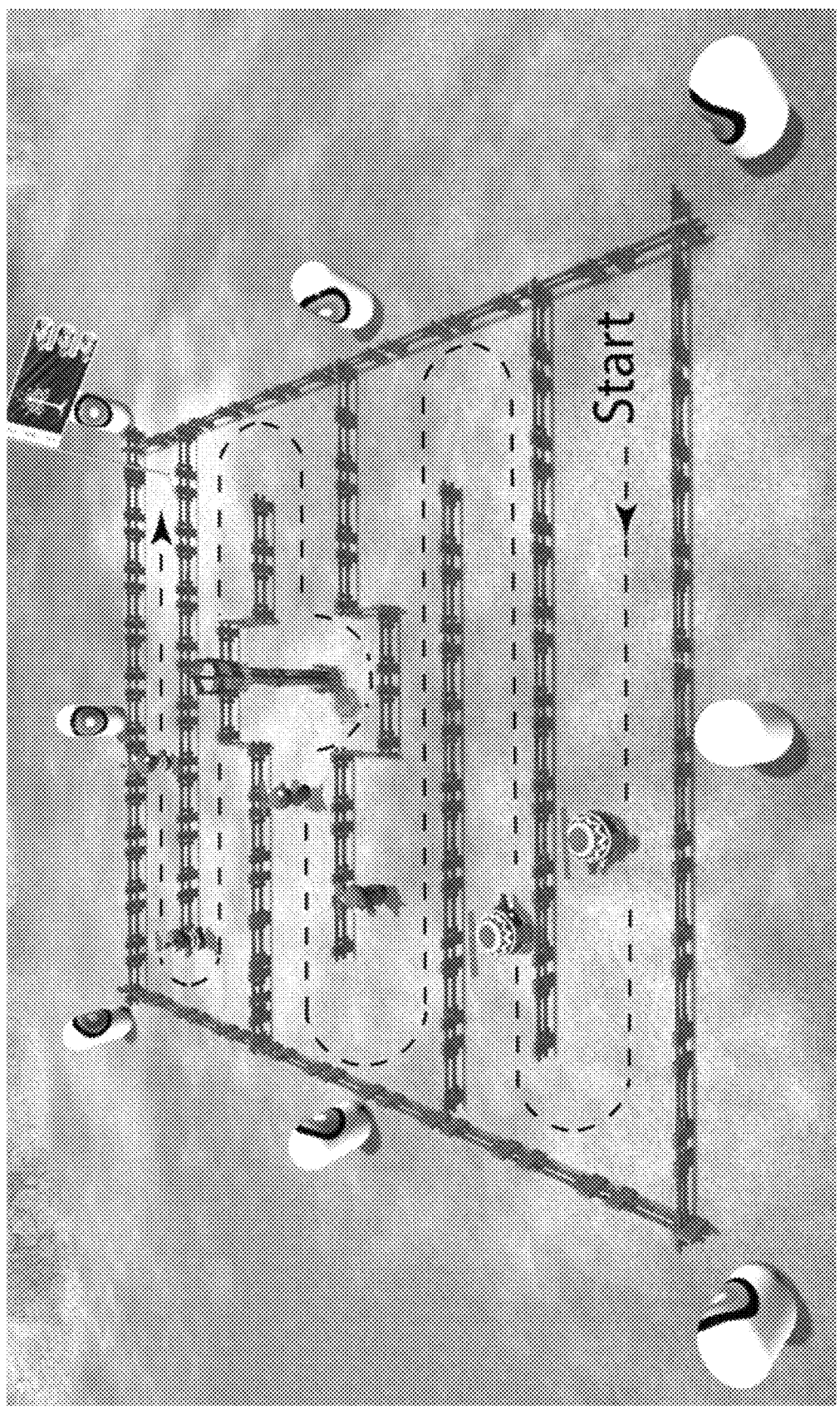
FIG. 6 illustrates an example of a level in the Longbowman game world.

A level of Longbowman is composed of a sequence of chunks, realized as waves of enemies that appear in the game. The player stands on a tower located at the center of the game world, which gives them the widest field of view of the game world, and flexibility to turn around and shoot. As the game starts, a wave of enemies is spawned at the lower-right corner of the game world every 10 second according to the current chunk type of the level (see FIG. 6). The enemies follow a predefined path trying to walk to the upper-right corner to reach a flag, at which point they will disappear and become unavailable for shooting. The dashed line denotes the predefined walking path of the enemies. Enemies appear in an order of sequence optimized with respect to the exercise intensity target for clearing the level. The goal of the player is to shoot as many enemies as possible to get high scores. The game ends either when the player has eliminated the last wave of enemies or when all enemies have escaped by reaching the flag.

Approach

As Longbowman is a 3D shooting type of game, its concept of chunks is quite different from that of Reflex. In Longbowman, a chunk refers to a wave of enemies that will appear in the game and that the player needs to shoot. We define three types of enemies: Zombunny, with one health point (i.e., killed by 1 hit) and high moving speed; Zombear, with two health points and medium moving speed; and Helephant, with three health points and low moving speed. FIG. 5B shows their appearances.

There are nine types of chunks, consisting of one, two, or three occurrences of Zombunny, Zombear, or Helephant in a wave. In general, a chunk made of one occurrence of Zombunny is the easiest to clear, while a chunk made of three occurrences of Helephants is the hardest.

Exercise intensity associated with each chunk type is measured following the same procedure described above based on heart rates. A chunk made of three occurrences of Helephants imposes the highest exercise intensity.

Results.

We apply our optimization framework to synthesize different levels for Longbowman. Similar to Reflex, we synthesize three levels: easy, medium, and hard, with target mean intensity level $\rho m$ set as 16%, 19%, and 21% respectively; and target calories burned $\rho cal$ set as 15 kcal, 20 kcal and 40 kcal. We set the target duration time $\rho d$ as 180 seconds for all three levels.

Figure 10A:
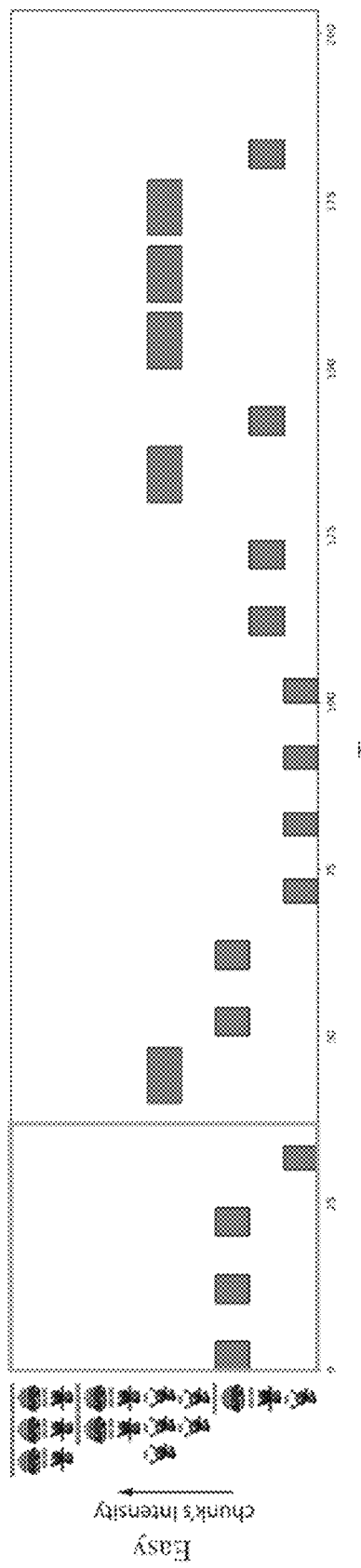
FIG. 10A illustrates a chunk type and sequence in an example of a level for the shooting example game, Longbowman set for an easy or low exercise intensity level where each bar refers to a chunk that appears at a certain time in the level.
Figure 10B:
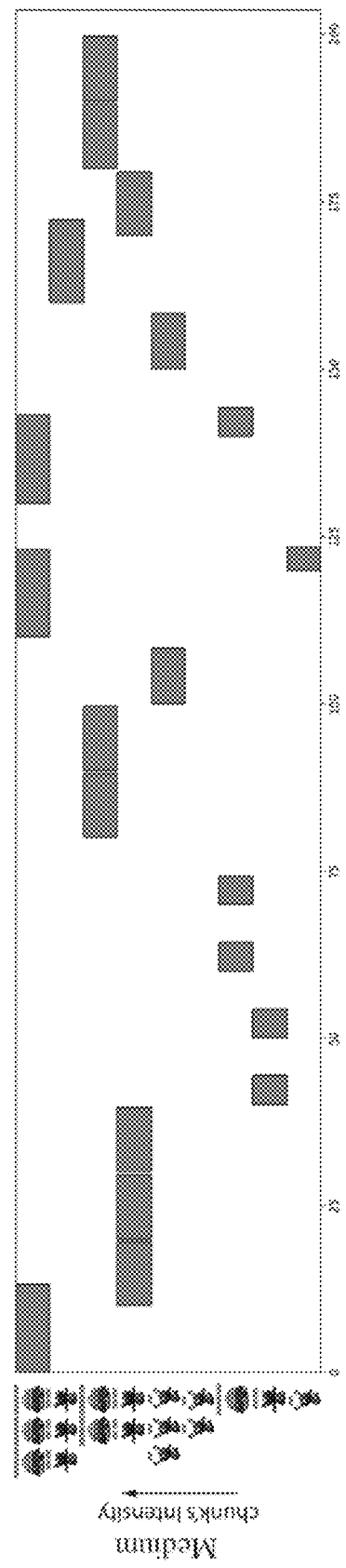
FIG. 10B illustrates a chunk type and sequence in an example of a level for the shooting example game, Longbowman set for a medium exercise intensity level.
Figure 10C:
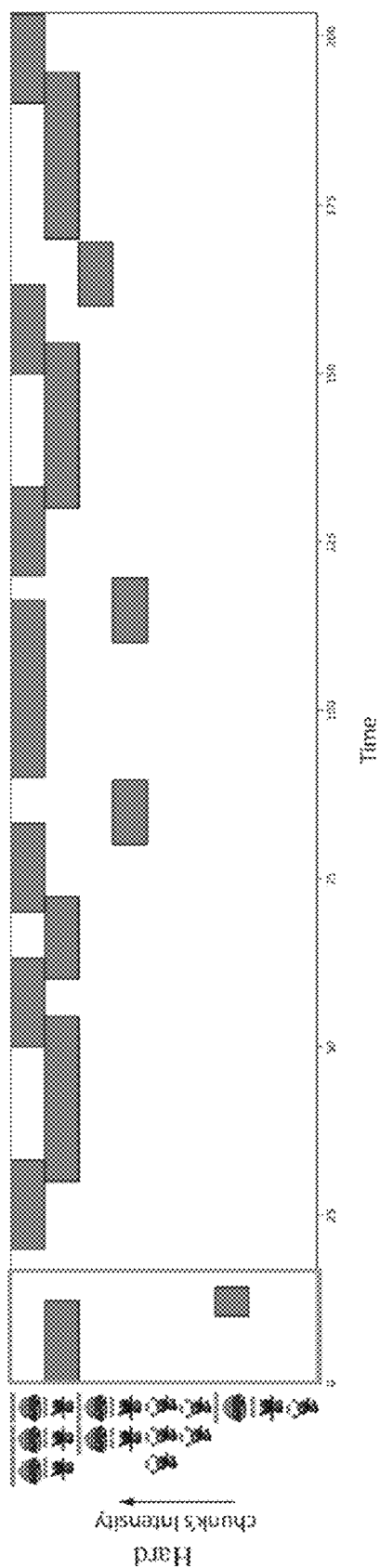
FIG. 10C illustrates a chunk type and sequence in an example of a level for the shooting example game, Longbowman set for a difficult or high exercise intensity level.
Figure 11A:
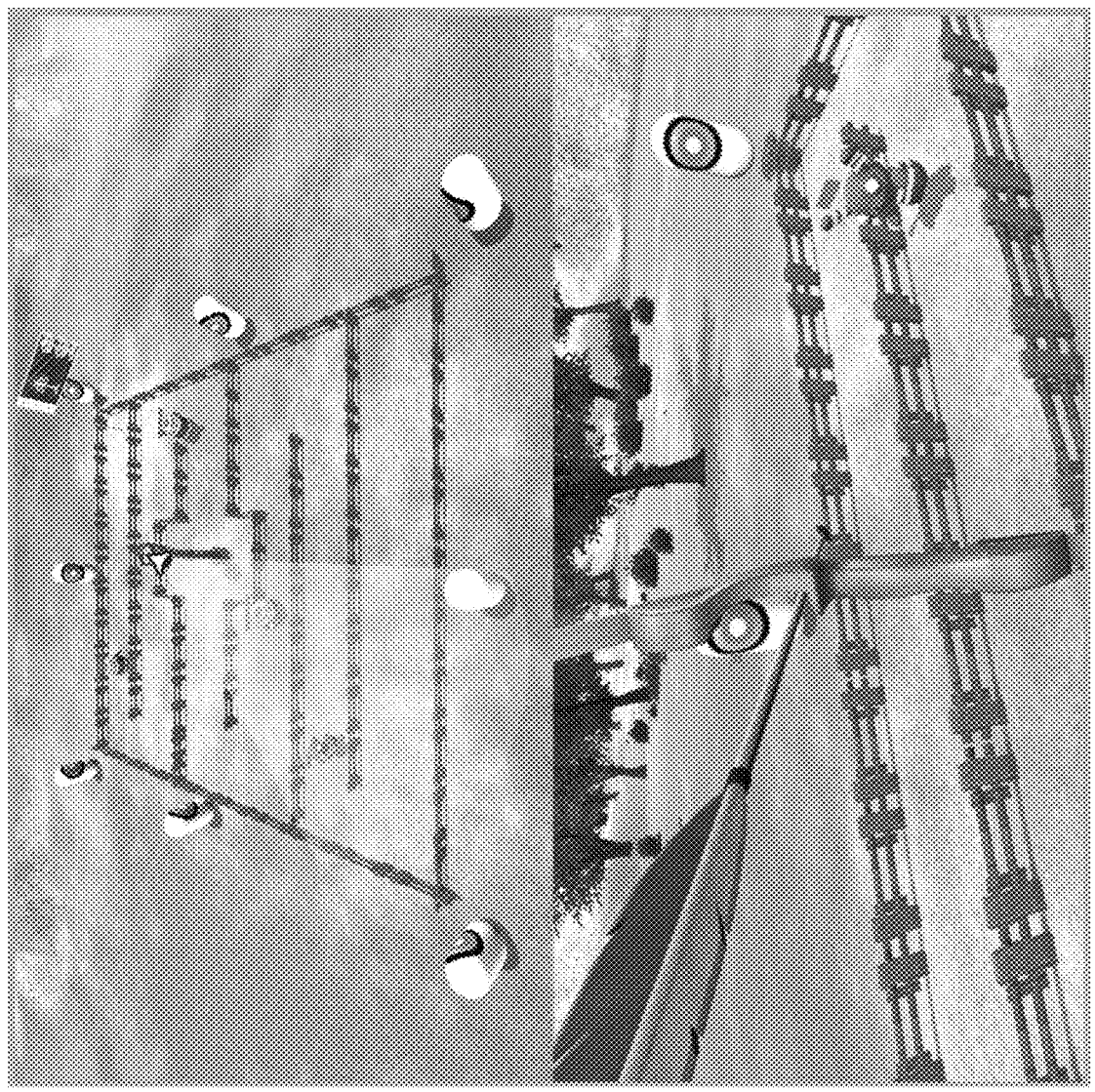
FIG. 11A is a 3D view of a portion of a level of the shooting example game, Longbowman corresponding to the highlighted portion of the level illustrated in FIG. 10A at the beginning of the level where the view of the player in the lower pane is represented by the highlighted area in the upper pane.
Figure 11B:
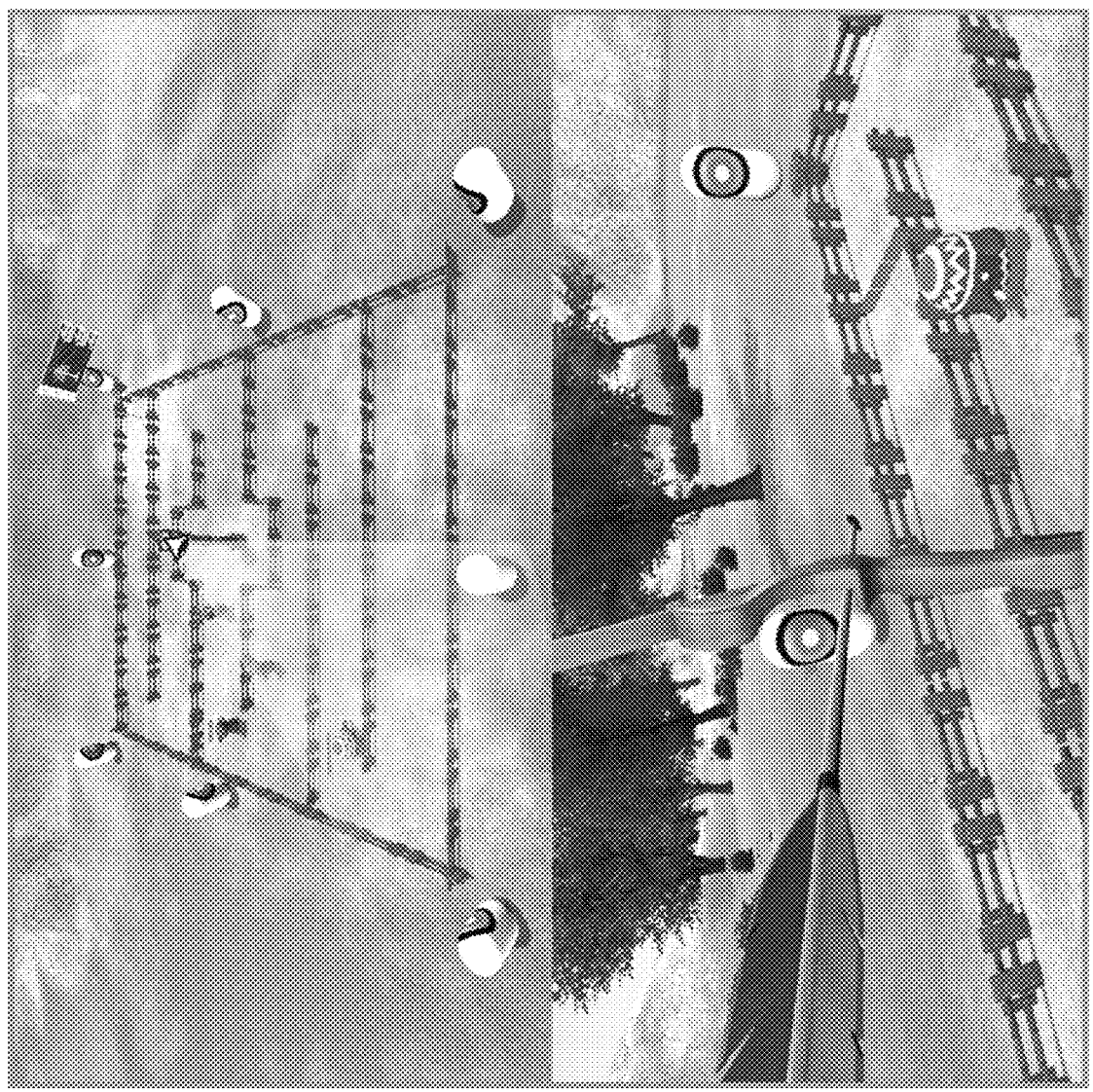
FIG. 11B is a 3D view of a portion of a level of the shooting example game, Longbowman corresponding to the highlighted portion of the level illustrated in FIG. 10C at the beginning of the level.

FIG. 10A-10C depict the easy, medium, and hard synthesized levels, respectively, and FIGS. 11A and 11B shows screenshots during the gameplay for the portion of the easy level identified in FIG. 10A and the portion of the hard level indicated in FIG. 10C, respectively. Note that the chunk types shown on the left-hand-side of each plot are sorted according to their associated exercise intensity. It can be seen that the easy level is dominated with chunks of low intensity (e.g., "1 Zombunny", "1 Zombear"); the medium level is assembled by chunks of mixed intensities; and the hard level is dominated with chunks of high intensity (e.g., "3 Helephants", "3 Zombears"). We validate the exercise intensity levels that these levels impose on players in our user evaluation test.

Other Results

Figure 12A:
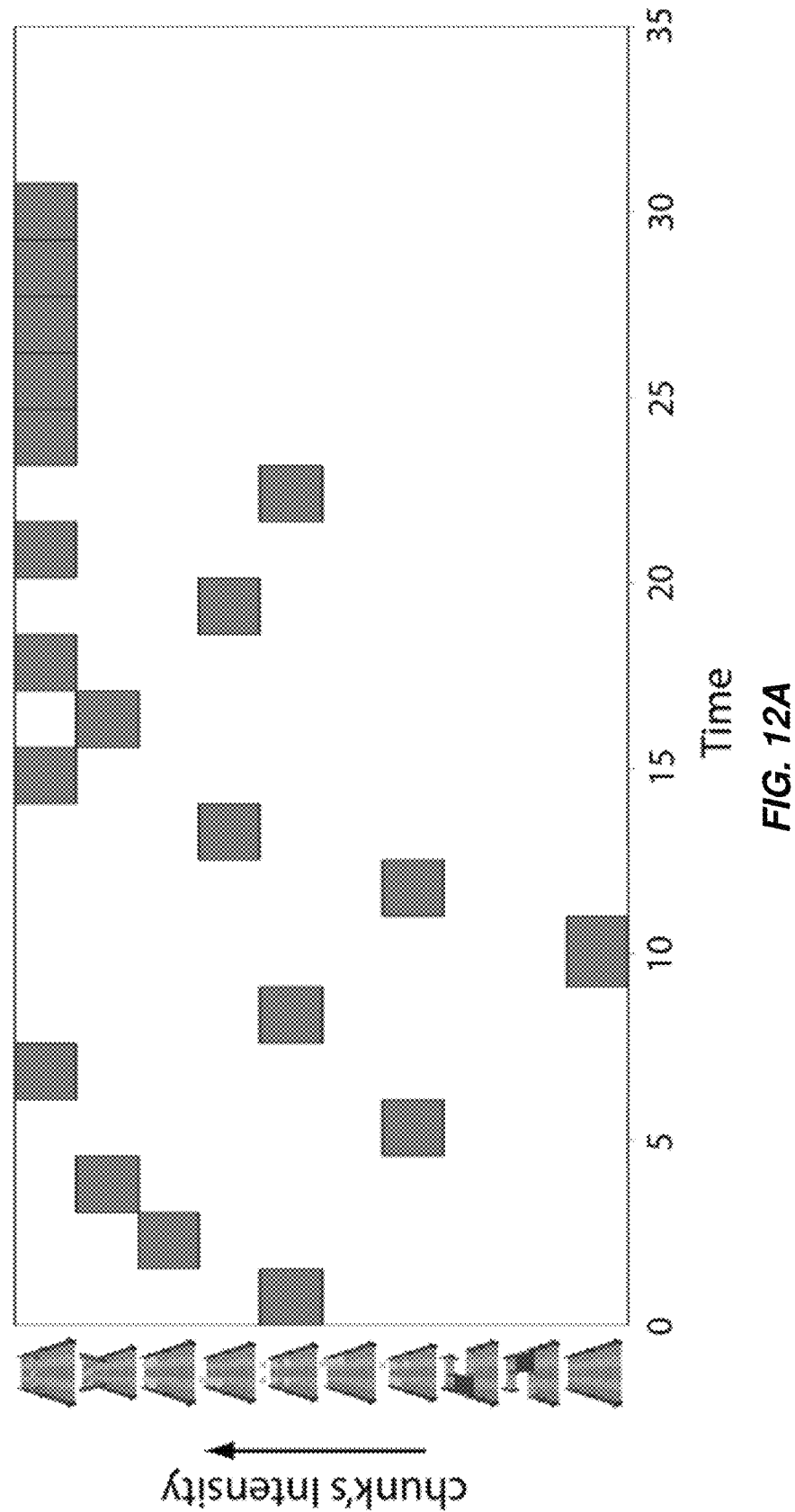
FIG. 12A illustrates a sequence of chunks for a level for the running example game, Reflex with a target calories burned of 5 kcal and a duration of 30 seconds.
Figure 12B:
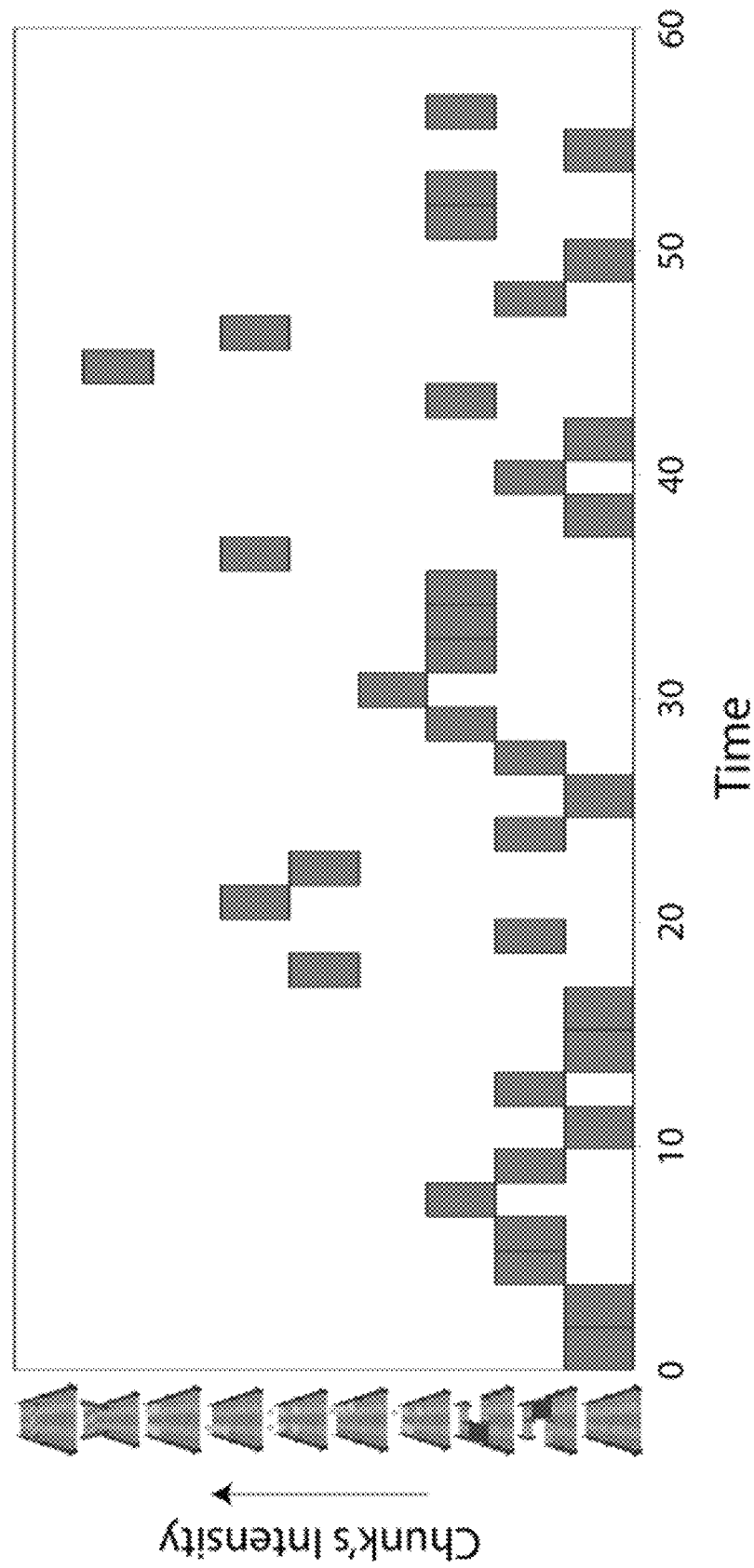
FIG. 12B illustrates a sequence of chunks for a level for the running example game, Reflex with a target calories burned of 5 kcal and a duration of 60 seconds.

Different Duration: The designer can also synthesize levels with the same expected amount of calories burned but with different expected gameplay duration. FIGS. 12A and 12B illustrate two examples of levels for the Reflex game. The two examples have the same target calories burned (5 kcal) but different target duration (30 seconds and 60 seconds). The 30-second level has more high-intensity chunks while the 60-second level has more low-intensity chunks. To achieve the same amount of calories burned, the optimizer allocates more high-intensity chunks for the 30-second level while it allocates more low-intensity chunks for the 60-second level.

Fixing Chunks: The designer can synthesize a level with some of the chunks manually assigned and fixed. The optimizer with optimize the rest of the level automatically with respect to the fixed chunks. FIG. 13 shows an example for the Reflex game.

Evaluation

We conducted user evaluation tests to validate the effectiveness of our approach in synthesizing game levels optimized with respect to desired physical difficulty levels.

Settings

We used the easy, medium, and hard levels synthesized for the games Reflex and Longbowman for our user evaluation test. FIGS. 8A-8C and 10A-10C depict the levels. Through the data collected from the participants, we wanted to measure whether the mean exercise intensity levels and calories burned correspond to the target values specified in optimizing the levels. We also wanted to see whether The Borg Ratings of Perceived Exertion (RPE) given by the participants correspond to the general physical difficulty (i.e., easy, medium, and hard) of the levels. RPE is frequently used in exercise sciences as a quantitative measure of perceived exertion during physical activity.

Participants

To conduct the evaluation, 21 participants were recruited to play each game. The participants were university students and staff, whose ages range from 16 to 37. All participants were reported healthy and had experience using virtual reality devices.

Figure 14:
FIG. 14 illustrates a user wearing a heart rate sensor that tracked the heart rate of the user during an experiment participating in the exergames disclosed herein.

To measure the fatigue level of the participant, we used a wearable activity tracker, the Polar™ heart rate sensor, to keep track of the heart rates of the participants (FIG. 14). The participant wore this device throughout the whole experiment. A higher recorded heart rate corresponds to more calories burned and a higher fatigue level in general. For each level, we discard the first 30 seconds of heart rate data as it refers to the period that the participant was warming up. After finishing each level, the participant was also asked to give a rating of perceived exertion (RPE) in a 6 to 20 scale to describe the physical efforts involved in completing the level as he perceived, with "6" indicating "No exertion", "13" indicating "Somewhat hard exertion", and "20" indicating "Maximal exertion".

Procedure

Before starting the test, a participant was first briefed about the game control and was allowed to get familiar with the gameplay in a warm-up session. After that, the participant was asked to take a rest such that his heart rate got back to his resting heart rate. Then he played the easy, medium, and hard levels of the game in a randomized order. After playing a level, he gave a RPE for the level. Then he was asked to take a rest so that his heart rate got back to the normal level before playing another level. This process was repeated until he finished playing each level of each game.

For Reflex, the participant was asked to complete each level by going through all its chunks. For Longbowman, the participant was asked to shoot as many enemies as possible. As a motivation, he was told before the test that the amount of monetary reward that he would receive as a participant would depend on the number of enemies he had shot, though at the end we would pay everyone the same amount of monetary reward regardless.

Results

Figure 15A:
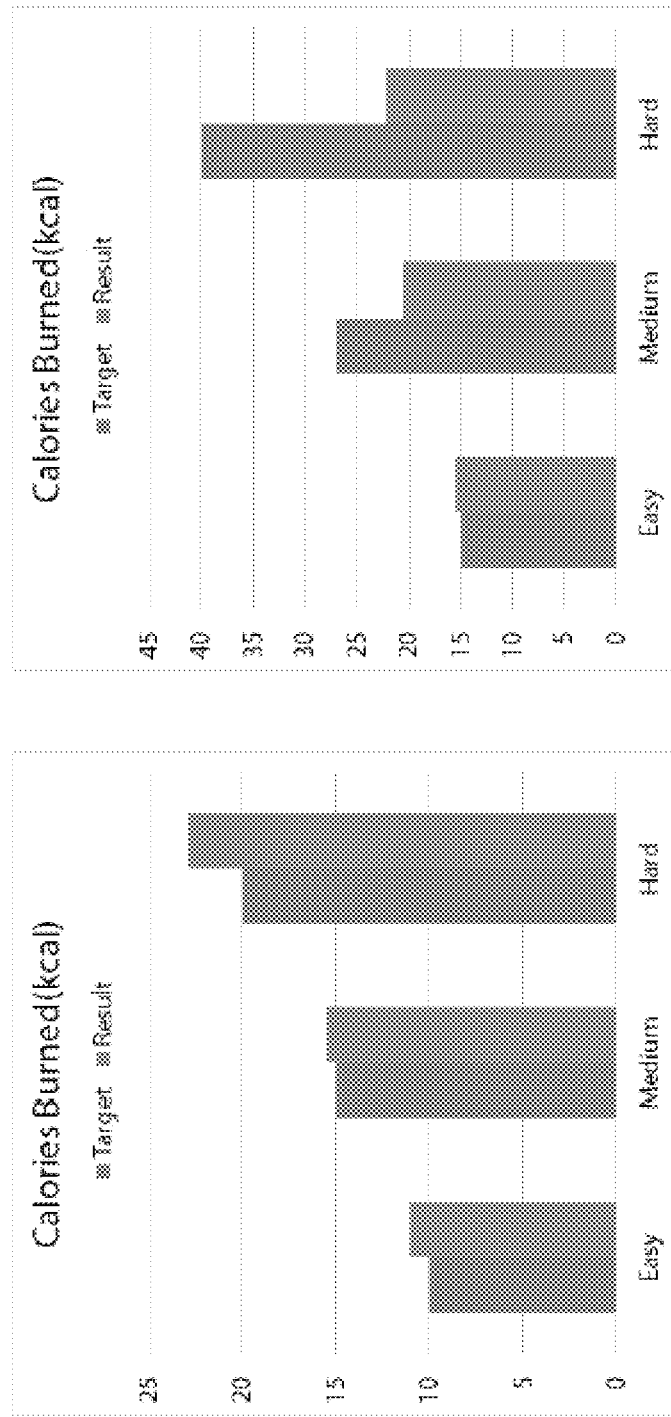
FIG. 15A illustrates observed vs. target calories burned for participants who played the easy, medium, and hard level examples of the Reflex and Longbowman games illustrated in FIGS. 8A-8C and 10A-10C, respectively.
Figure 15B:
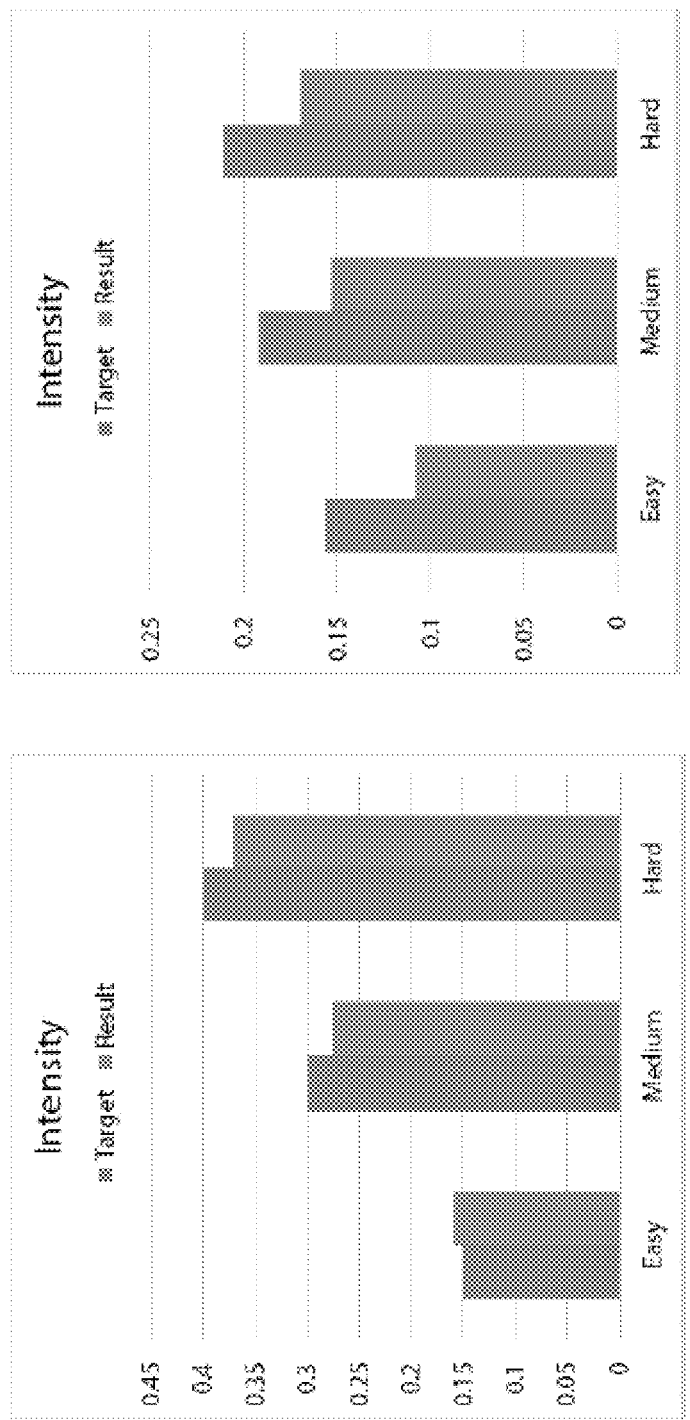
FIG. 15B illustrates observed vs. target exercise intensity for participants who played the easy, medium, and hard level examples of the Reflex and Longbowman games illustrated in FIGS. 8A-8C and 10A-10C, respectively.
Figure 15C:
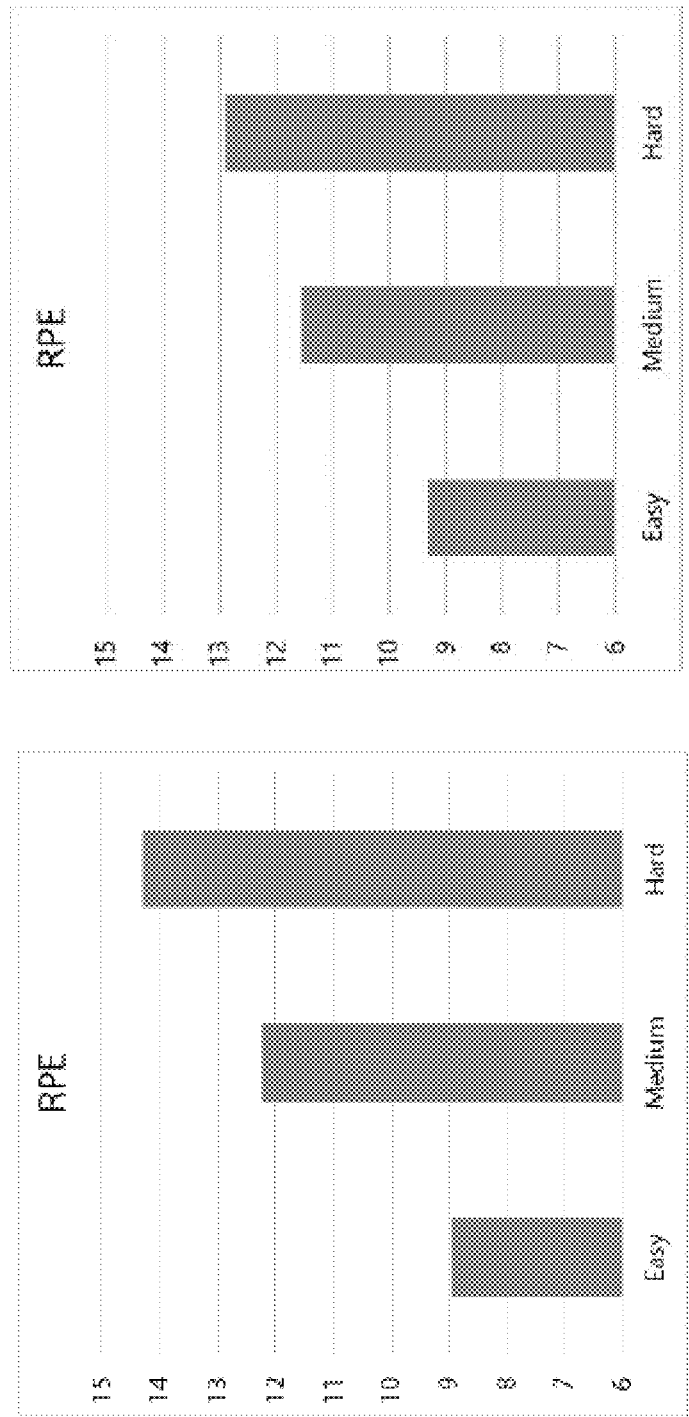
FIG. 15C illustrates observed vs. target reported perceived exertion (RPE) for participants who played the easy, medium, and hard level examples of the Reflex and Longbowman games illustrated in FIGS. 8A-8C and 10A-10C, respectively.

FIGS. 15A-15C shows the results of the user evaluation tests. For each game, the average calories burned and the average exercise intensity levels for the easy, medium, and hard levels are shown, which are compared with the target values used for synthesizing the levels. The results show corresponding trends as the target values, with greater deviation observed for the medium and hard levels of Longbowman. The ratings of perceived exertion (RPE) also increase with the physical difficulty of the levels for both games.

For Reflex, it can be observed that the average results follow the target values specified for synthesizing the levels quite closely. For both calories burned and exercise intensity, the results and target values differ only by about 10% or less. The RPEs for the easy, medium, and hard levels are 8.96, 12.25, and 14.29 respectively, corresponding to "very light", "somewhat hard" and "hard" according to Borg's scale.

For Longbowman, more significant deviation is observed between the average results and the target values specified for synthesis, especially for the medium and hard level, though the results still increase with the physical difficulty of the levels as expected. The RPEs for the easy, medium and hard levels are 9.28, 11.57 and 12.90, corresponding to "very light", between "light" and "somewhat hard", and "somewhat hard", respectively.

A hypothesized reason for the small deviation in the results of Reflex is that the participants were "forced" to complete each chunk of a level by moving their bodies accordingly in order to finish the whole level. The sequence of motions they performed were literally the same as expected, and hence the amount of calories burned and the exercise intensity levels. In contrast, in Longbowman, some participants might have failed to complete some chunks (i.e., some participants might have failed or did not attempt to shoot some of the enemies before they escaped). Some participants might not have gone through the whole sequence of body motions as expected to shoot the enemies, hence resulting in a lower amount of calories burned and exercise intensity level than expected. This deviation from expectation is especially pronounced for the medium and hard levels, probably because some participants felt that it was tiring to fully complete those levels. In fact, the percentages of enemies killed for the medium and hard levels are 73% and 53% respectively, in contrast to 96% for the easy level, which might justify the explanation.

The results hint that a level designer can apply aspects and embodiments of the disclosed approach to automatically generate levels of a motion-based game that can help players to achieve calories burned and exercise intensity targets, which are specified as optimization parameters. How closely those targets are met depends on whether the player is compulsorily required to complete each chunk of a level. Not enforcing such compulsory requirement may result in more deviation from the target, yet the player may find the gaming experience more relaxing given the flexibility.

User Feedback

We spoke with the participants after the experiments. A majority of the participants found the two games entertaining. Some reported that exergaming changed the way they used to think of workout, which impressed them as repetitive, boring and not engaging. They said that they would be more motivated to exercise in virtual environments because of the appealing events and effects they could experience in virtual worlds.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of" are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The invention claimed is:

1. A method for generating a design of a level in a user motion-based game, the method comprising:
    defining a plurality of different types of chunks to select from to combine to form the game level, each of the different types of chunks having an associated exercise intensity property, at least some of the different types of chunks having different associated exercise intensity properties than others of the different types of chunks; and
    performing an optimization including:
        assembling the game level with one of different numbers and different types of chunks in different iterations of the optimization;
        evaluating the game level assembled in each iteration for a physical difficulty the game level is predicted to impose on a game player performing the game level; and
        iteratively updating the number and/or types of chunks in the game level until a desired extent of predicted physical difficulty for the game player performing the game level is obtained.

2. The method of claim 1, wherein defining the plurality of different types of chunks further includes defining different types of chunks having different respective durations.

3. The method of claim 2, wherein performing the optimization includes selecting a game level design that minimizes a total cost function including energy intensity cost functions associated with each of a total predicted number of calories that the player would burn to complete the game level, a mean exercise intensity predicted to be experienced by the game player while performing the game level, and a variance in predicted energy intensity among the chunks making up the game level.

4. The method of claim 3, wherein the total cost function further includes a duration cost function associated with a difference between a calculated duration of the game level and a target duration of the game level.

5. The method of claim 3, wherein the total cost function further includes an adjacent chunk variation cost function associated with adjacent chunks in the game level being either of the same type or different types.

6. The method of claim 3, wherein the optimization terminates if a change is the total cost function is less than a predetermined amount for a predetermined number of previous iterations.

7. The method of claim 1, wherein performing an iteration of the optimization includes determining whether to modify a game level design of an immediately previous iteration by one of adding a chunk to the game level design of the immediately previous iteration, removing a chunk from the game level design of the immediately previous iteration, or modifying a chunk of the game level design of the immediately previous iteration.

8. The method of claim 7, wherein adding a chunk to the game level design of the immediately previous iteration includes adding a randomly selected type of chunk to a random location within the game level design of the immediately previous iteration.

9. The method of claim 7, wherein removing a chunk from the game level design of the immediately previous iteration includes removing a randomly selected chunk from the game level design of the immediately previous iteration.

10. The method of claim 7, wherein modifying a chunk of the game level design of the immediately previous iteration includes modifying a randomly selected of chunk within the game level design of the immediately previous iteration to be a randomly selected different type of chunk.

11. The method of claim 7, wherein a determination regarding accepting a modification to the game level design in the iteration of the optimization is made based at least partially on a comparison between an evaluation of the total cost function of the modified game level and an evaluation of the total cost function of the game level design of the immediately previous iteration.

12. The method of claim 11, further comprising reducing the probability of accepting a modification to the game level as the optimization progresses.

13. The method of claim 1, further comprising limiting a total number of each type of chunk to include in the game level to a predefined number.

14. A computer system including a processor and instructions, which when performed on the processor, cause the processor to perform a method, the method comprising:
    defining a plurality of different types of chunks to select from to combine to form the game level, each of the different types of chunks having an associated exercise intensity property, at least some of the different types of chunks having different associated exercise intensity properties than others of the different types of chunks; and
    performing an optimization including:
        assembling the game level with one of different numbers and different types of chunks in different iterations of the optimization;
        evaluating the game level assembled in each iteration for a physical difficulty the game level is predicted to impose on a game player performing the game level; and
        iteratively updating the number and/or types of chunks in the game level until a desired extent of predicted physical difficulty for the game player performing the game level is obtained.

15. The computer system of claim 14, wherein defining the plurality of different types of chunks further includes defining different types of chunks having different respective durations.

16. The computer system of claim 15, wherein performing the optimization includes selecting a game level design that minimizes a total cost function including energy intensity cost functions associated with each of a total predicted number of calories that the player would burn to complete the game level, a mean exercise intensity predicted to be experienced by the game player while performing the game level, and a variance in predicted energy intensity among the chunks making up the game level.

17. The computer system of claim 16, wherein the total cost function further includes a duration cost function associated with a difference between a calculated duration of the game level and a target duration of the game level.

18. The computer system of claim 14, wherein performing an iteration of the optimization includes determining whether to modify a game level design of an immediately previous iteration by one of adding a chunk to the game level design of the immediately previous iteration, removing a chunk from the game level design of the immediately previous iteration, or modifying a chunk of the game level design of the immediately previous iteration.

19. The computer system of claim 14, wherein the method further comprises limiting a total number of each type of chunk to include in the game level to a predefined number.

20. A computer program product comprising a non-transitory storage medium, the computer program product including code that, when executed by processing circuitry of a computing device, causes the processing circuitry to perform a method, the method comprising:
    defining a plurality of different types of chunks to select from to combine to form the game level, each of the different types of chunks having an associated exercise intensity property, at least some of the different types of chunks having different associated exercise intensity properties than others of the different types of chunks; and
    performing an optimization including:
        assembling the game level with one of different numbers and different types of chunks in different iterations of the optimization;
        evaluating the game level assembled in each iteration for a physical difficulty the game level is predicted to impose on a game player performing the game level; and
        iteratively updating the number and/or types of chunks in the game level until a desired extent of predicted physical difficulty for the game player performing the game level is obtained.

* * * * *

UNITED STATES PATENT AND TRADEMARK OFFICE
CERTIFICATE OF CORRECTION

PATENT NO.         : 11,014,003 B2
APPLICATION NO.    : 16/706118
DATED              : May 25, 2021
INVENTOR(S)        : Yu et al.

It is certified that error appears in the above-identified patent and that said Letters Patent is hereby corrected as shown below:

In the Claims

In Column 14, Claim 6, Line 63, delete "a change is the total" and insert -- a change in the total --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*